United States Patent
Iguchi et al.

(10) Patent No.: US 8,050,328 B2
(45) Date of Patent: Nov. 1, 2011

(54) IMAGE DECODING METHOD

(75) Inventors: Masayasu Iguchi, Hyogo (JP); Shinya Kadono, Hyogo (JP); Tadamasa Toma, Osaka (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 1448 days.

(21) Appl. No.: 10/592,788

(22) PCT Filed: Jan. 11, 2006

(86) PCT No.: PCT/JP2006/300236
§ 371 (c)(1),
(2), (4) Date: Sep. 14, 2006

(87) PCT Pub. No.: WO2006/075635
PCT Pub. Date: Jul. 20, 2006

(65) Prior Publication Data
US 2008/0232467 A1    Sep. 25, 2008

(30) Foreign Application Priority Data

Jan. 17, 2005 (JP) ................................. 2005-009677

(51) Int. Cl.
*H04N 7/12* (2006.01)
*H04N 5/93* (2006.01)

(52) U.S. Cl. .................................... 375/240.25; 386/344

(58) Field of Classification Search ............ 375/240.25, 375/240.01; 386/343, 353, 344; 348/439.1, 348/714
See application file for complete search history.

(56) References Cited

U.S. PATENT DOCUMENTS

| | | | | |
|---|---|---|---|---|
| 5,321,508 A | * | 6/1994 | Veltman et al. | 348/439.1 |
| 5,438,376 A | * | 8/1995 | Watanabe | 348/714 |
| 6,069,993 A | * | 5/2000 | Kawara | 386/353 |
| 6,337,880 B1 | * | 1/2002 | Cornog et al. | 375/240.01 |
| 6,584,152 B2 | * | 6/2003 | Sporer et al. | 375/240.01 |
| 6,807,363 B1 | * | 10/2004 | Abiko et al. | 386/343 |
| 6,993,248 B1 | | 1/2006 | Kato | |
| 2005/0147375 A1 | | 7/2005 | Kadono | |

FOREIGN PATENT DOCUMENTS

| | | |
|---|---|---|
| EP | 1 043 892 | 10/2000 |
| EP | 1 223 754 | 7/2002 |
| EP | 1 589 767 | 10/2005 |
| JP | 2000-341640 | 12/2000 |
| JP | 2004-242286 | 8/2004 |
| WO | 2004/066635 | 8/2004 |

* cited by examiner

OTHER PUBLICATIONS

ISO/IEC 14496-10, International Standard: "*Information Technology—Coding of Audio-Visual Objects—Part 10: Advanced Video Coding*", Second Edition, Oct. 1, 2004, pp. 82-100.

*Primary Examiner* — Gims Philippe
(74) *Attorney, Agent, or Firm* — Wenderoth, Lind & Ponack, L.L.P.

(57) ABSTRACT

An image decoding method includes a first storage step of sequentially decoding pictures in a stream, storing a picture to be used as a reference into a picture memory, and managing the picture. Further, the image decoding method includes a determination step of determining whether or not random access reproduction has been designated, a state change step of changing a management state for managing a picture in the picture memory, when the random access reproduction has been designated, and a second storage step of sequentially decoding each of the coded pictures from a random access reproduction destination, storing, into the picture memory, a picture to be used as a reference, and managing the picture. This image decoding method enables the decoding of pictures with reference to an appropriate picture even when random access reproduction is performed.

22 Claims, 23 Drawing Sheets

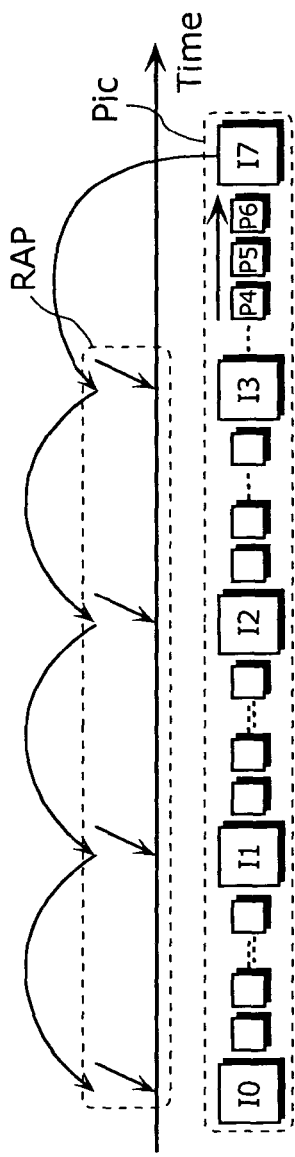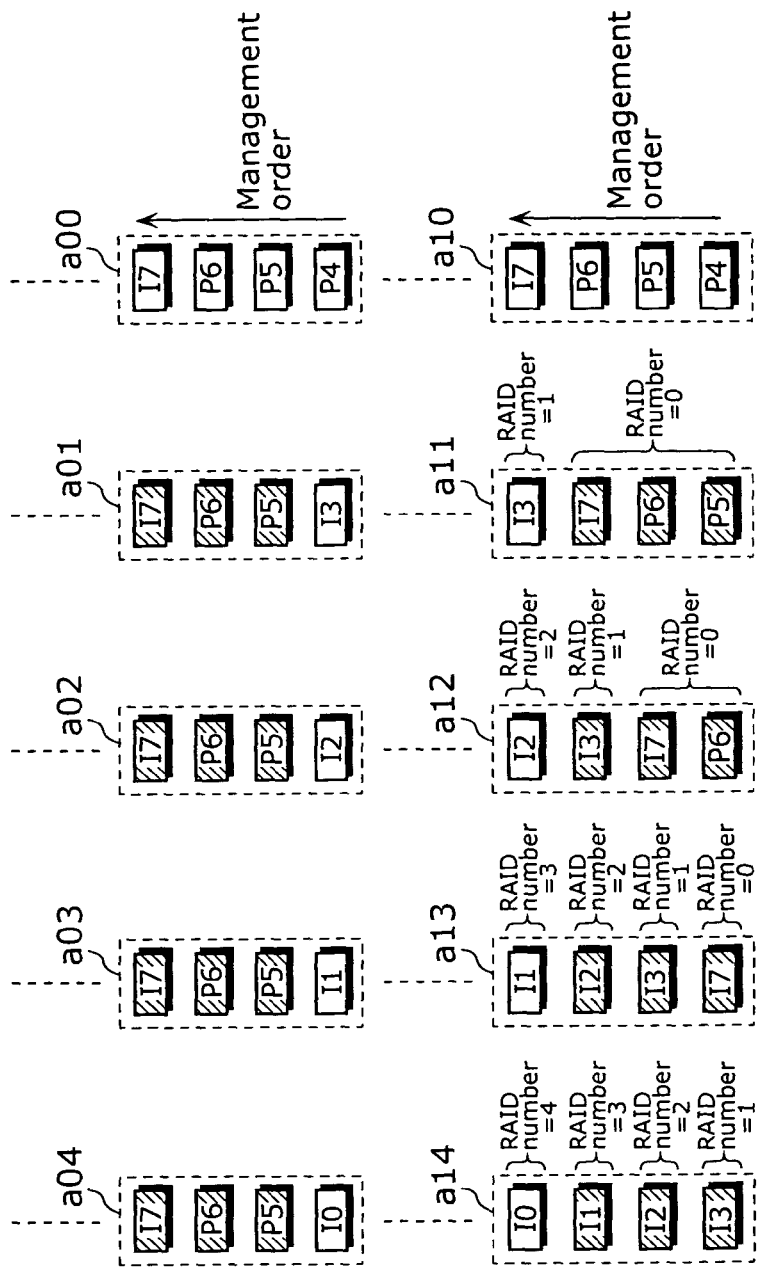
FIG. 19(a)
FIG. 19(b)
FIG. 19(c)

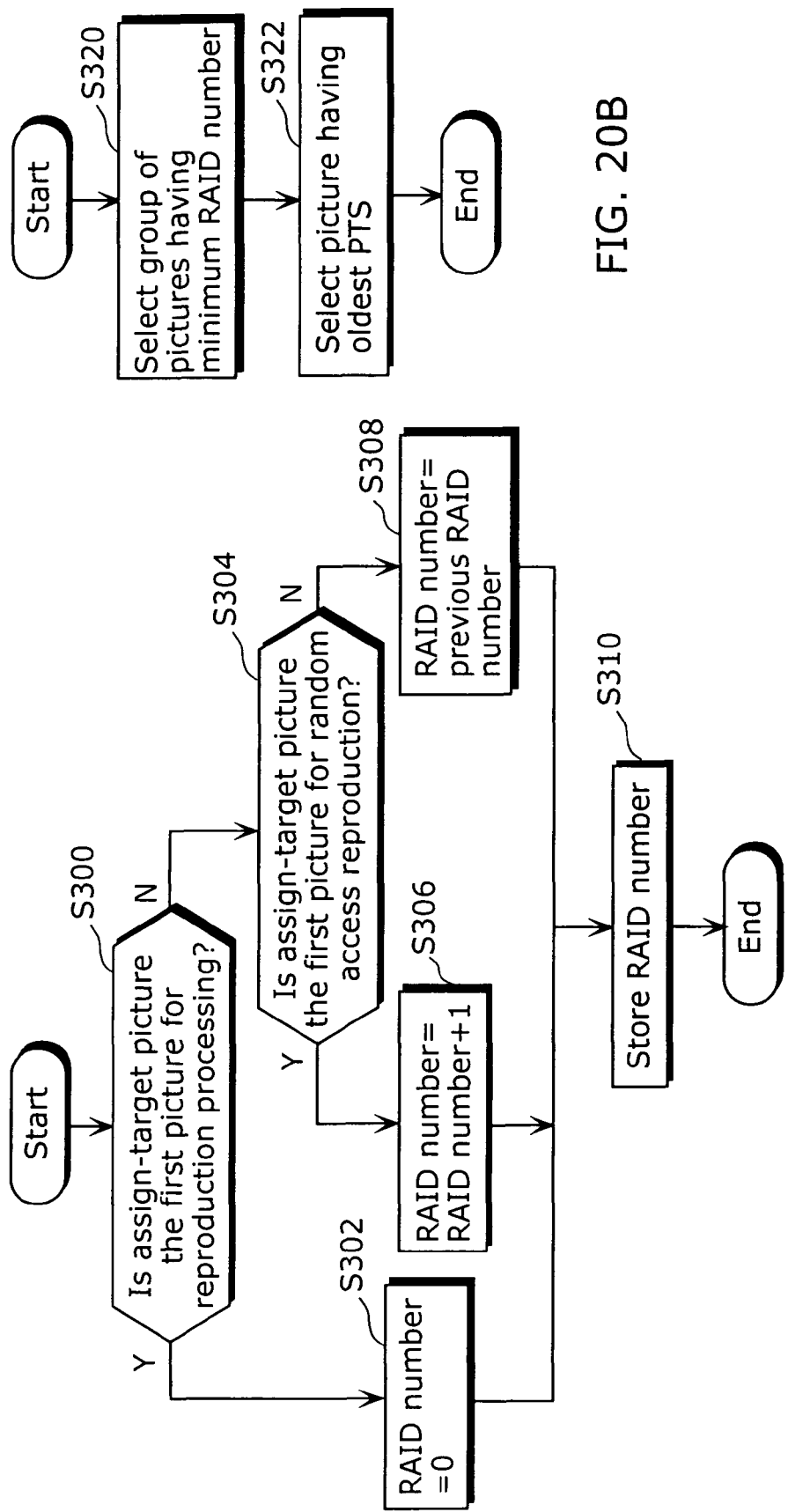

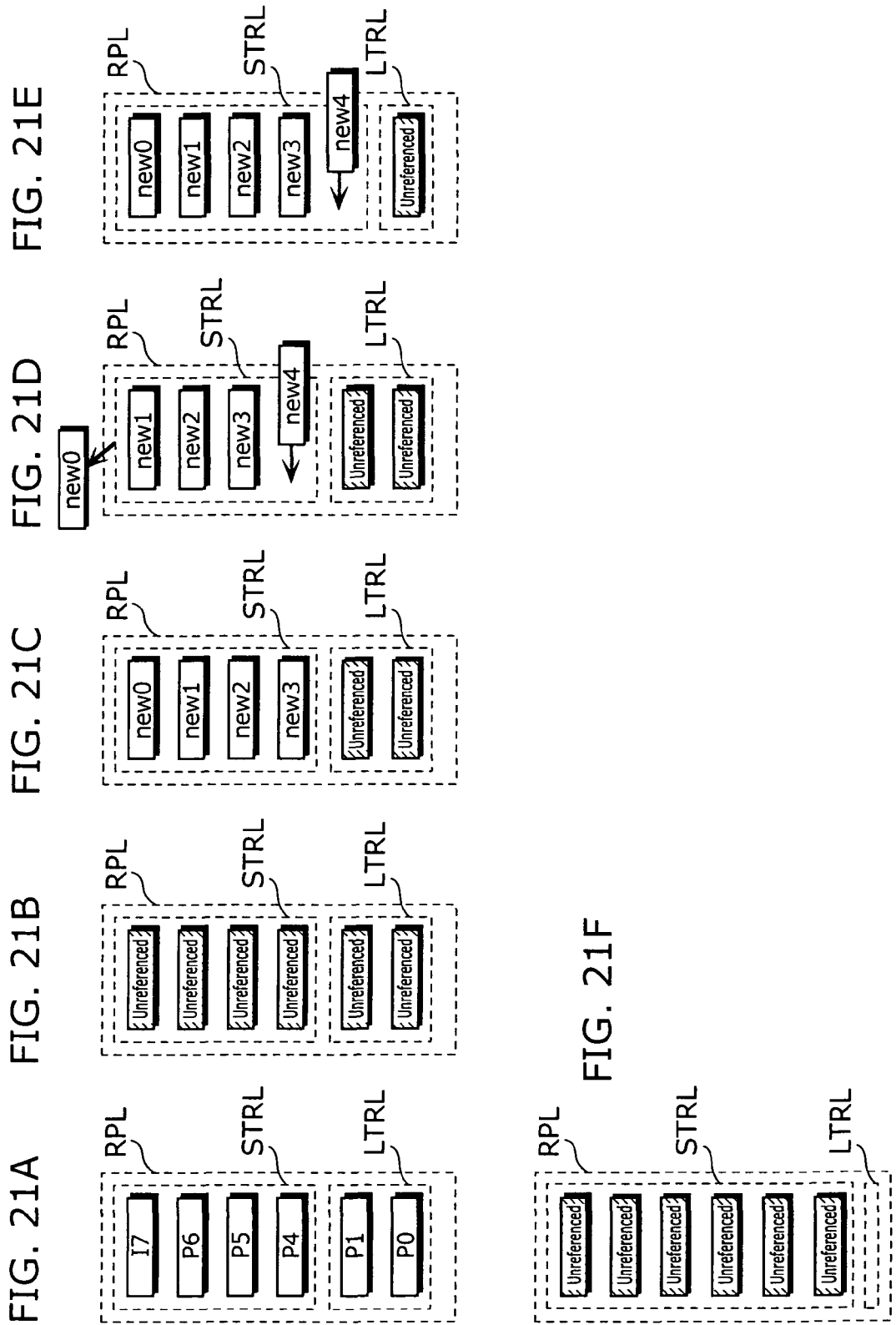

IMAGE DECODING METHOD

TECHNICAL FIELD

The present invention relates to an image decoding method for decoding and reproducing coded pictures in a stream.

BACKGROUND ART

Recently, with the arrival of the age of multimedia in which audio, video and the like are integrally handled, existing information media such as newspapers, journals, TVs, radios and telephones and other means through which information is conveyed to people has come under the scope of multimedia. Generally speaking, multimedia refers to something that is represented by associating not only characters but also graphics, audio and especially images and the like together. However, in order to include the aforementioned existing information media in the scope of multimedia, it appears as a prerequisite to represent such information in digital form.

However, when estimating the amount of information contained in each of the aforementioned information media as the amount of digital information, the information amount per character requires 1 to 2 bytes whereas the audio requires more than 64 Kbits (telephone quality) per second, and when it comes to a moving picture, it requires more than 100 Mbits (present television reception quality) per second. Therefore, it is not realistic for the information media to handle such an enormous amount of information as it is in digital form. For example, although video phones are already in the actual use via Integrated Services Digital Network (ISDN) which offers a transmission speed of 64 Kbits/s to 1.5 Mbits/s, it is impossible to transmit images on televisions and images taken by cameras directly through ISDN.

This therefore requires information compression techniques, and for instance, in the case of the videophone, moving picture compression techniques compliant with H.261 and H.263 standards recommended by International Telecommunication Union-Telecommunication Standardization Sector (ITU-T) are employed. According to the information compression techniques compliant with the MPEG-1 standard, image information as well as audio information can be stored in an ordinary music Compact Disc (CD).

Here, Moving Picture Experts Group (MPEG) is an international standard for compression of moving picture signals standardized by International Standards Organization/International Electrotechnical Commission (ISO/IEC), and MPEG-1 is a standard to compress moving picture signals down to 1.5 Mbps, that is, to compress information of TV signals approximately down to a hundredth. The transmission rate within the scope of the MPEG-1 standard is set to about 1.5 Mbps to achieve the middle-quality picture, therefore, MPEG-2 which was standardized with the view to meet the requirements of high-quality picture allows data transmission of moving picture signals at a rate of 2 to 15 Mbps to achieve the quality of TV broadcasting. In the present circumstances, a working group (ISO/IEC JTC1/SC29/WG11) in charge of the standardization of the MPEG-1 and the MPEG-2 has achieved a compression rate which goes beyond what the MPEG-1 and the MPEG-2 have achieved, further enabled encoding/decoding operations on a per-object basis and standardized MPEG-4 in order to realize a new function required in the era of multimedia. In the process of the standardization of the MPEG-4, the standardization of encoding method for a low bit rate was aimed; however, the aim is presently extended to a more versatile coding of moving pictures at a high bit rate including interlaced pictures.

Furthermore, MPEG-4 AVC and ITU H.264 have been standardized since 2003 as a next-generation picture coding scheme with higher compression rate, which are jointly worked by the ISO/IEC and the ITU-T (for example, refer to Non-Patent Reference 1). Currently, regarding H.264 standard, a draft of its revised standard in compliance with a High Profile which is suited for High Definition (HD) pictures have been developed. Whereas a DVD player which reproduces a movie and the like are widely known as an application of using the MPEG-2 moving picture compression technology, the H.264 compression standard has been scheduled to be adapted to a player using a Blu-ray Disk ROM (BD-ROM). Currently, its format standard has been developed.

In general, in coding of a moving picture, the amount of information is compressed by reducing redundancy in temporal and spatial directions. Therefore, an inter-picture prediction coding, which aims at reducing the temporal redundancy, estimates a motion and generates a predictive picture on a block-by-block basis with reference to prior and subsequent pictures, and then codes a differential value between the obtained predictive picture and a current picture to be coded. Here, a "picture" is a term to represent a single screen and it represents a frame when used for a progressive picture whereas it represents a frame or fields when used for an interlaced picture. The interlaced picture here is a picture in which a single frame consists of two fields respectively having different time. For coding and decoding an interlaced picture, three ways are possible: processing a single frame either as a frame, as two fields or as a frame/field structure depending on a block in the frame.

A picture to which an intra-picture prediction coding is performed without reference pictures is referred to as an "I-picture". A picture to which the inter-picture prediction coding is performed with reference to only a single picture is referred to as a "P-picture". A picture to which the inter-picture prediction coding is performed by referring simultaneously to two pictures is referred to as a "B-picture". The B-picture can refer to two pictures, arbitrarily selected from the pictures which are displayed either before or after a current picture to be coded, as an arbitrary combination. Whereas the reference pictures can be specified for each block that is a fundamental unit of coding and decoding, they are distinguished as a first reference picture and a second reference picture. Here, the first reference picture is a first reference picture to be described in a coded bit stream and the second reference picture is a reference picture to be described after the first reference picture in the coded bit stream. However, the reference pictures need to be already coded and decoded as a condition to code and decode these I-picture, P-picture, and B-picture.

A motion compensation inter-picture prediction coding is used for coding the P-picture or the B-picture. The motion compensation inter-picture prediction coding is a coding method which adopts motion compensation to an inter-picture prediction coding. The motion compensation is a method of reducing the amount of data while increasing prediction precision by estimating an amount of motion (this is referred to as a motion vector, hereinafter) of each part in a picture not by simply predicting a picture from a pixel value of a reference frame, and by performing prediction in consideration of the estimated amount of data. For example, the amount data is reduced by estimating a motion vector of a current picture to be coded and coding a predictive difference between a predicted value which is shifted as much as the estimated motion vector and the current picture to be coded. Since this method requires information about the motion vector at the time of decoding, the motion vector is also coded and recorded or transmitted.

The motion vector is estimated on a macroblock basis. Specifically, a motion vector is estimated by fixing a macroblock of a current picture to be coded, moving a macroblock of the reference picture within a searching range, and finding a position of the reference block which is approximate to the standard block.

FIG. 1A and FIG. 1B are diagrams, each of which showing a configuration of a conventional MPEG-2 stream.

As shown in FIG. 1A and FIG. 1B, the MPEG-2 stream has a following hierarchical structure. A stream is made up of a plurality of Group of Pictures (GOP). A moving picture can be edited and randomly accessed by setting each GOP as a basic unit for coding. Each GOP is made up of plural pictures, each of which is one of an I picture, a P picture and a B picture. In addition, each stream, GOP and picture includes a synchronous signal (sync) indicating a boundary between respective units and a header that is data commonly included in respective units.

FIG. 2 is a diagram showing a configuration of another conventional stream.

This stream corresponds to a JVT (H.264/MPEG-4 AVC) which has been currently developed for standardization by a joint cooperation with ITU-T and ISO/IEC. In JVT, there is no concept of a header and common data is placed in a head of the stream with a name of a parameter set PS. Furthermore, while there is no concept corresponding to GOP, a randomly-accessible unit, which corresponds to GOP, can be structured by dividing data with a special picture unit which can be decoded without relying on other pictures. This unit is called as a random access unit RAU. As the parameter set PS, there are a picture parameter set PPS which is data corresponding to a header of each picture and a sequence parameter set SPS corresponding to a header of a unit that is equal to or greater than GOP in the MPEG-2. Each picture has an identifier attached which indicates one of the picture parameter set PPS and the sequence parameter set SPS to which the picture refers. Specifically, plural picture parameter sets PPS and sequence parameter sets SPS that are different from each other are coded only once, so that excess coding caused by coding the same parameter sets (headers) several times for each picture is omitted and the compression rate is increased, by indicating, with an identifier, one of the parameter sets to which a current picture refers. A picture number PN is an identification number for identifying a picture. Here, the picture number PN is a number indicating a display order of a picture, and is different from PictureNumber showing a decoding order as disclosed in the Non-Patent Reference 1. The sequence parameter set SPS includes the maximum number of reference-available pictures, picture size and the like. The picture parameter set PPS includes a type of variable length coding (switching between Huffman coding and arithmetic coding), an initial value of quantization step, the number of reference pictures, and the like.

FIG. 3A and FIG. 3B are diagrams for explaining a reference state between GOPs used for the conventional MPEG-2 and the like.

FIG. 3A shows a predictive configuration among pictures in a Closed GOP. In this diagram, the diagonally shaded pictures are pictures to be referred to by other pictures. Furthermore, each picture is arranged in display order. In the Closed GOP configuration, B pictures (B6 and B7), which are displayed before the displayed time of an Instantaneous Decoding Refresh (IDR) picture, can be predictive-coded with reference only to the IDR picture and cannot refer pictures that belong to a different GOP. In addition, FIG. 3B shows a predictive configuration among pictures in an Open GOP. In this diagram, the diagonally shaded pictures are pictures to be referred to by other pictures as in the case of FIG. 3A. Furthermore, each picture is arranged in display order. In the Open GOP configuration, B pictures (B6 and B7), which are displayed temporally before an I picture (I8), can be predictive-coded with reference to pictures in the same GOP3 and a P picture (P5) in a GOP4 which is positioned immediately before the GOP3.

In the MPEG-2, P pictures (P2, P5, P11, and P14) can be predictive-coded with reference to only an I picture or a P picture displayed temporally immediately before the current P picture. Furthermore, B pictures (B0, B1, B3, B4, B6, B7, B9, B10, B12 and B13) can be predictive-coded with reference to one of an I picture and a P picture displayed temporally immediately before the current B, and a one of an I picture and a P picture displayed temporally immediately after the current B picture, and their arrangement order in a stream has been determined.

On the other hand, the H.264 standard introduces a very flexible predictive structure among pictures in order to significantly increase coding efficiency (a compression rate). Specifically, a P picture is not restricted to refer to only one picture displayed immediately before the current P picture. A different reference picture for the P picture can be selected for each coded block from among I pictures, P pictures or B pictures despite the display order of these pictures, if those pictures have been decoded and managed in a buffer for reference pictures. Similarly, B picture is not restricted to refer to only one picture each displayed immediately before and after the B picture. Here, a different set of two pictures can be selected for each coded block from among I pictures, P pictures or B pictures despite the display order of those pictures.

In a BD-ROM format standard, pictures can be random access units RAUs even in the case where the pictures are arranged in a stream having the Open GOP structure as similar to the case of the conventional structure. However, following restrictions are for example set for predictive-coding among pictures under the H.264 standard.

(1) Since there is a possibility that B pictures (B6 and B7), which are displayed temporally immediately before an I picture designated as a random access reproduction start point, refer to pictures displayed temporally before and after the B pictures. Therefore, the B pictures are not displayed at the time of random access reproduction.

(2) A picture displayed temporally after the I picture designated as a random access reproduction start point must not refer to a picture displayed temporally before said I picture.

FIG. 4 is a block diagram of an image decoding apparatus which realizes a conventional image decoding method.

The image decoding apparatus shown in FIG. 4 includes a variable length decoding unit 901, a motion compensation unit 902, a picture memory 903, an adding unit 904 and a conversion unit 905.

The variable length decoding unit 901 decodes a stream Str, and outputs a quantized value Qco, a relative index Ind, a picture type Pty, and a motion vector MV. The quantized value Qco, the relative index Ind and the motion vector MV are respectively inputted into and decoded by the picture memory 903, the motion compensation unit 902, and the conversion unit 905.

The conversion unit 905 inverse quantizes the quantized value Qco so as to reconstruct a frequency coefficient, further inverse-frequency converts the frequency coefficient into a pixel differential value, and outputs the resultant to the adding unit 904.

The adding unit 904 adds the pixel differential value and a predictive image outputted from the motion compensation unit 902, and generates a decoded picture Vout. The generated decoded picture Vout is stored into the picture memory 903. Herein, as in the case where plural pictures can be used as reference pictures, each block requires a reference number (a relative index Ind) for specifying an identification number of a picture to be referred to. Accordingly, by obtaining a correspondence between a relative index Ind and a picture number of each picture stored in the picture memory 903, a reference picture can be specified based on the relative index Ind.

The picture memory 903 has a reference picture list, and reference pictures that are decoded and used as references are stored in the reference picture list. Furthermore, the reference picture list has a list (STRL=Short Term Reference List) for performing First In First Out (FIFO) management of reference pictures, and a list (LTRL=Long Term Reference List) for managing whether or not to store, into the list, or delete the explicitly specified reference pictures.

The motion compensation unit 902 extracts an optimum image region for a predictive image from the decoded picture stored in the picture memory 903, based on the motion vector and relative index Ind detected through the aforementioned processing. The motion compensation unit 902 then generates the predictive image and outputs it to the adding unit 904.

Next, it shall be explained about a method of generating a picture number PN which is to be attached to each picture for specifying a picture based on the relative index Ind. Here, summaries of two methods out of three picture number PN generation methods defined by the H. 264 are explained as examples.

(Picture Number Generation Method Example 1)

FIG. 5 is an explanatory diagram of a picture number generation method example 1.

Hereinafter, the picture number generation method example 1 shall be explained with reference to FIG. 5. In the generation method example 1, a picture number PN is generated by adding an offset value Msb managed as a variable in decoding processing and a difference value (a count value Isb) from the offset value Msb attached to each picture.

In FIG. 5, each picture Pic is one of I, P, and B picture, and is arranged in display order on a screen. However, in decoding order, it is assumed that pictures are decoded in the following order of IDR, . . . , P3, B1, B2, P6, B4, B5, I9, B7, B8, and . . . . Both Msb1 and Msb2 indicate values of offset values Msb, where Msb1=96 and Msb2=112.

As shown in a head of the picture Pic arrangement, an IDR picture is placed, as an I picture to be decoded at first in the access unit AU, at a start point of a stream or in a place where there is no reference relationship between a current GOP to be decoded and a GOP which is positioned immediately before the current GOP. First, when the IDR picture is decoded, an offset value Msb is initialized to 0 and the count value Isb is also 0. Therefore, a picture number PN of said IDR picture becomes 0. For example, when the count value Isb is 3 for the next P picture, Msb+Isb=0+3=3 is obtained. Therefore, a picture number PN for said P picture is 3.

Furthermore, when the count value Isb is 1 for the subsequent B picture, 0+1=1 is obtained so that a picture number PN for said B picture is 1. In addition, when the count value Isb is 2 for the next subsequent B picture, 0+2=2 is obtained so that a picture number PN for that B picture is 2.

Here, when the count value Isb reaches a predetermined value (a maximum count value Lsb) while repeating the aforementioned operations, the maximum count value Lsb is added to the offset value Msb and the count value Isb is managed so as not to exceed the maximum count value Lsb, in order to prevent an increase in the number of bits of the count value Isb and a decrease in coding efficiency. For example, in the case where the maximum count value Lsb=16, if the count value Isb reaches the maximum count value Lsb for six times, it indicates that the offset value Msb has been updated to the value of 0+16×6=96.

Furthermore, when the picture P3 is decoded, in the case where the offset value Msb has been updated to 96 and the count value Isb equals to 12, the picture number PN of the picture P3 is obtained as 96+12=108. Similarly, for B1, B2, P6, B4 and B5 pictures (in decoding order), when the respective count values Isb are 10, 11, 15, 13 and 14, the picture numbers PN are respectively 107, 108, 111, 109 and 110.

Furthermore, for I9, B7, B8, B10 and subsequent pictures, the count value Isb exceeds the maximum count value Lsb of 16 if the count value Isb is continued to be increased. Therefore, the count value Isb is controlled so as to be the value less than 16 by updating the offset value Msb as obtained by the offset value of Msb=Msb1+maximum count value Lsb=96+16=112. Accordingly, for the pictures I9, B7, B8 and B10, the respective count values Isb are 2, 0, 1 and 3, and the respective picture numbers PN are 114, 112, 113 and 115.

As described in the above, a picture number PN is generated using the count value Isb, which is attached to each picture, and the offset value Msb, which is updated and managed in decoding processing, and an order of displaying on a screen and reference pictures can be managed using the generated picture number PN.

(Picture Number Generation Method Example 2)

FIG. 6 is an explanatory diagram of the picture number generation method example 2.

In the picture number generation method example 2 shown in FIG. 6, the offset value FNO managed as a variable in decoding processing is added to the frame number (a count value) fn attached to each picture, and generates a picture number PN by doubling the sum. It should be noted that, in the case of an unreferenced picture, a picture number PN is generated for that picture by subtracting 1 from the calculated sum.

FNO1 and FNO2 are values of offset values FNO. In the example shown in FIG. 6, FNO1 is 96 and FNO2 is 112.

First, when an IDR picture is decoded, an offset value FNO is initialized to 0, and a frame number fn becomes 0 as well as the picture number PN for said IDR picture. When the frame number fn is 1 for the next B picture, 2×(offset value FNO+frame number fn)=2×(0+1)=2 is obtained and the picture number PN for said B picture becomes 2.

Furthermore, when the frame number fn is 2 for the subsequent B picture, 2×(0+2)=4 is obtained, and the picture number PN for that B picture becomes 4. When the frame number fn is 3 for the next subsequent P picture, 2×(0+3)=6 is obtained and the picture number PN for said P picture becomes 6.

In the case where the frame number fn of a current picture is smaller than the frame number of a picture which is decoded temporally immediately before the current picture, the offset value FNO is updated by adding the maximum frame number MFN to the offset value FNO.

This is a mechanism for reducing the amount of coded bits by restricting an available value range for the frame number to be equal to or smaller than a predetermined value, and for also indicating a large picture number PN. In FIG. 6, for example, it is indicated that the offset value FNO is FNO1 when the frame number fn of a current picture became smaller than the frame number of a picture that is decoded temporally immediately before the current picture for six times, and the offset value FNO1 is updated to the state of FNO2 when the above situation occurred for the seventh time.

For example, when a picture B1 in the picture Pic is decoded, if the offset value FNO is updated to 96 and the frame number fn is 10, the picture number PN of the picture B1 is obtained by 2×(96+10)=212. Similarly, in the case where pictures B2, P3, B4, B5 and P6 (in decoding order) have respective frame numbers fn of 11, 12, 13, 14 and 15, their picture numbers PN are respectively 214, 216, 218, 220 and 222.

Furthermore, when a picture B7 is decoded, if the frame number fn is 0 which is the value smaller than 15 that is the frame number of a picture positioned immediately before the picture B7, the offset value FNO is updated to FNO=FNO1+ maximum frame number MFN=96+16=112. Accordingly, the picture number PN of the picture B7 becomes 2× (112+0)=224. Similarly, when the pictures B8, I9 and B10 have respective frame numbers fn of 1, 2 and 3, respective picture numbers PN of 226, 228 and 230 are obtained.

Thus, as similar to the case of the picture number generation method example 1, the picture number PN can be generated using a value of a frame number fn attached to each picture and an offset value FNO which is updated and managed in decoding processing. Therefore, the reference pictures can be managed using the generated picture number. It should be noted that, in the picture number generation method example 2, the decoding order is same as the display order.

Non-Patent Reference 1: ISO/IEC 14496-10, International Standard: "Information technology—Coding of audio-visual objects—Parts 10: Advanced video coding" (Dec. 1, 2003), pp. 82-100.

DISCLOSURE OF INVENTION

Problems that Invention is to Solve

However, in the aforementioned conventional image decoding method, there is a problem of decoding a current picture to be decoded with reference to inappropriate pictures when random access reproduction is performed.

For example, when random access reproduction is performed by a BD-ROM, if a position of a stream designated as a start point of the random access reproduction has an Open GOP structure, normal decoding processing cannot be performed solely based on the aforementioned BD-ROM format restriction.

Such problem is not caused in a picture reference relationship in inter-picture motion estimation prediction under the conventional MPEG-2 and the like. In such case, a picture to be referred to by a B picture is restricted to one of an I picture and a Picture positioned immediately before said B picture or one of an I picture and a P picture positioned immediately after said B picture. Therefore, even when random access reproduction for the Open GOP is performed, normal decoding processing starting from an I picture can be performed simply by not decoding and displaying only the B picture temporally positioned before the I picture which is positioned at the reproduction start point in displaying order.

However, in the case of H.264 standard, plural reference pictures can be selected. Therefore, in the case where random access reproduction (trick-play) starting from a Random Access Point (RAP) having an Open GOP structure is performed, picture numbers cannot be generated normally since reproduction information of pictures, which should have been stored in the picture memory 103 through original normal consecutive reproductions, positioned prior to the reproduction start position do not exist.

Specifically, when random access reproduction is performed, the management of pictures on the reference picture list based on the picture numbers is disturbed causing, as a result, a problem that each picture included in a stream cannot be decoded normally with reference to an appropriate picture.

Hereinafter, there shall be provided two examples relating to a state in which a picture number cannot be normally generated when random access reproduction is performed so that based effect is given on the management of the reference picture list and the selection of reference pictures become abnormal.

(Example of Malfunction Using Picture Number Generation Method Example 1)

FIG. 7 is a diagram of explaining a management method of an STRL using the picture number generation method example 1. It should be noted that FIG. 7 shows a state of the STRL managed by FIFO when following the flow of decoding shown in FIG. 5. Here, in order to simplify the explanation, it is assumed that each STRL manages four reference pictures. As similar to the case of FIG. 5, PN indicates a picture number and Pic indicates a picture to be decoded. FIG. 7 differs from FIG. 5 in that pictures Pic are aligned in decoding order. It is assumed that RAP indicates a random access point and a stream has an Open GOP structure. Furthermore, STRL (a) to (f) respectively indicate a state of an STRL managed by FIFO, and shows a state transition of STRLs along with decoding of pictures.

When a random access unit RAU has a Closed GOP structure, an IDR picture is firstly decoded. Herein, each region managed by the STRL becomes all empty (a state shown as STRL (a)), and the picture number PN is initialized to 0. Next, after the IDR picture is decoded, said IDR picture is inserted into the STRL (a state shown as STRL (b)). Hereinafter, after a picture Pic which is necessary to be managed as a new reference picture is decoded, cancellation and addition of reference pictures are performed in accordance with the FIFO management in each STRL.

For example, when the picture P3 having the picture number PN of 108 is decoded as a reference picture, a picture having a picture number PN which is smaller than 99 from the STRL becomes an unreferenced picture, and said picture P3 having the picture number PN of 108 is newly added to the STRL (a state shown as STRL (c)). Furthermore, when pictures B1 and B2 having the picture numbers PN of 106 and 107 are decoded as unreferenced pictures, and the picture P6 having the picture number PN of 111 is decoded as a reference picture, a picture Px having a picture number PN of 99 from the STRL becomes an unreferenced picture, and said picture P6 having the picture number PN of 111 is newly added to the STRL as a reference picture (a state shown as STRL (d)).

Furthermore, when pictures B4 and B5 having respective picture numbers PN of 109 and 110 are decoded as unreferenced pictures, and the picture I9 having the picture number PN of 114 is decoded as a reference picture over the random access point RAP, a picture Py having the picture number PN of 102 becomes an unreferenced picture from STRL, and said picture I9 having the picture number PN of 114 is newly added to the STRL as a reference picture (state shown as STRL (e)).

Following that, when pictures B7 and B8 having respective picture numbers PN of 112 and 113 are decoded as unreferenced pictures, and the picture P12 having the picture number PN of 117 is decoded as a reference picture, a picture Pz having the picture number PN of 105 becomes an unreferenced picture from STRL, and said picture P12 having the picture number PN of 117 is newly added to the STRL as a reference picture (state shown as STRL (f)). As similar to the aforementioned process, the pictures B10 and B11 having respective picture numbers PN of 115 and 116 are decoded as unreferenced pictures, and reference picture management is continuously performed.

Each reference picture managed by the STRL is specified with the relative index Ind. Therefore, when a current picture to be decoded is a P picture, reference pictures are re-arranged in one list for a one-way reference, and when the current picture is a B picture, they are re-arranged in two lists for two-way references. L0_for_B11_n (L0 list) and L1_for_B11_n (L1 list) are lists to be generated when a picture B11 having a picture number PN of 116 is decoded. In the case where the current picture is a B picture, a reference picture having a picture number which is smaller than a picture number of the current picture is firstly arranged in order of a picture position closer to the current picture from among the reference pictures on the STRL, and a reference picture having a picture number which is greater than the picture number of the current picture is then arranged in order of a picture position closer to the current picture. Consequently, the aforementioned L0 list is generated. Furthermore, a reference picture having a picture number which is greater than the picture number of the current picture is firstly arranged in order of a picture position closer to the current picture from among the reference pictures on the STRL, and a reference picture having a picture number which is smaller than the picture number of the current picture is then arranged in order of a picture position closer to the current picture. Consequently, the aforementioned L1 list is generated. Reference pictures are determined by designating one picture each from the respective lists based on the relative indexes Ind.

Furthermore, Refldx corresponds to a list of relative indexes Ind and shows each relative index Ind so as to correspond to the arrangements of reference pictures on the respective L0 list and L1 list. For example, in the case of L0_for_B11_n, the picture I9 having the picture number PN of 114 is selected based on the relative index (index0), the picture P6 having the picture number PN of 111 is selected based on the relative index (index1), the picture P3 having the picture number PN of 108 is selected based on the relative index (index2), and the picture P12 having the picture number PN of 117 is similarly selected based on the relative index (index3).

However, in such picture number PN generation method, there is a case where the L0 list and L1 list cannot be managed appropriately when random access is performed.

FIG. 8 is a diagram of explaining an example of causing malfunction due to the list managed in the picture number generation method example 1. The example shown in FIG. 8 shows an example of the case where skip reproduction (random access reproduction) is performed from the picture I9 immediately after a B picture having a picture number of 101, that is the picture positioned four pictures ahead of the picture P3 shown in FIG. 7, is decoded. In FIG. 8, same reference numbers as in FIG. 7 are attached to indicate the same elements and overlapping explanations are omitted.

STRL (g) in FIG. 8 shows a state of the STRL when a picture number PN is 101. Furthermore, STRL (h) shows a state of the STRL after pictures are skipped from the B picture having the picture number PN of 101 to the picture I9 and the picture I9 is decoded. Here, when skip operation is performed, skipped pictures such as pictures P3, B1 and B2 (diagonally shaded pictures Pic in FIG. 8) are not decoded.

Therefore, the STRL is updated from the state of STRL(g), and the offset value Msb is retained at the previous offset value Msb (96). Accordingly, picture numbers of pictures I9, B7 and B8 are generated respectively as Msb+Isb=96+2=98, Msb+Isb=96+0=96, and Msb+Isb=96+1=97. However, since it is not necessary to decode B pictures displayed temporally immediately before an I picture at the time of random access, the pictures B7 and B8 indicated with striped lines in FIG. 8 are not decoded. Further, picture numbers of pictures P12, B10 and B11 are also generated respectively as 101, 99, and 100.

Furthermore, an L0 list and an L1 list are generated based on the value of picture number PN attached to each picture and the picture number PN of a current picture to be decoded. Accordingly, in the case where the picture B11 having a picture number PN of 100 is the current picture, L0 list (L0_for B11_r1) and L1 list (L1_for_B11_r1) are respectively "#99:Px, #98:I9, #101:P12, #102:Py" and "#101:P12, #102:Py, #99:Px, #98:I9".

However, whereas the picture I9 can be referred to from the L0 list using the relative index (index0) in the case of normal consecutive reproduction as shown in FIG. 7, the picture I9 cannot be referred to even similarly using the relative index (index0) and the picture Px is mistakenly referred to in the case of random access reproduction as shown in FIG. 8. In other words, when random access reproduction is performed, a current picture to be decoded is mistakenly decoded by referring to an inappropriate picture.

(Example of Malfunction of Picture Number Generation Method Example 2)

FIG. 9 is a diagram of explaining a management method of an STRL by the picture number generation method example 2.

In the case where the maximum value which can be managed as a picture number PN is a maximum picture number MPN, and a position of the picture I0 is designated as a random access point RAP of an Open GOP, in the normal consecutive reproduction, the offset value FNO at the time of decoding the picture I0 becomes a value obtained by the maximum picture number MPN−the maximum frame number MFN+1. Further, at the point when pictures up to picture P8 are decoded, the picture number of the picture P8 is the maximum picture number MPN so that the Open GOP is closed and a new GOP structure is started as a Closed GOP from the next IDR picture. Furthermore, when pictures I0, B1, B2, . . . , B6, B7 and B8 are respectively decoded, where respective frame numbers are 0, 1, 2, . . . , maximum frame number MFN−3, maximum frame number MFN−2, and maximum frame number MFN−1, picture numbers PN of the respective pictures are 2×(maximum picture number MPN−maximum frame number MFN+1), 2×(maximum picture number MPN−maximum frame number MFN+2), 2×(maximum picture number MPN−maximum frame number MFN+3), . . . , 2×(maximum picture number MPN−2), 2×(maximum picture number MPN−1), and 2×(maximum picture number MPN).

Here, it shall be explained about the case where a reproduction position is jumped from the picture B4 toward back (Back Jump) to a random access point RAP. In this case, the frame number fn of the picture B4 is the maximum frame number MFN−5, and the frame number fn of the picture I0 to be decoded after the Back Jump is 0. Therefore, (frame number fn of picture B4)>(frame number fn of picture I0) is obtained. Accordingly, the frame numbers fn are decreased so that the offset value FNO is updated from the maximum picture number MPN−maximum frame number MFN+1 to a maximum picture number MPN+1 to which the maximum frame number MFN is added. Consequently, the picture number PN of the picture I0 becomes 2(offset value FNO+frame number fn)=2(maximum picture number MPN+1+0)=2 (maximum picture number MPN+1).

Specifically, the picture number PN exceeds the maximum picture number MPN which is the manageable maximum picture number so that there is a possibility that the picture number PN becomes a negative value depending on a bit precision of the picture number PN. If a negative value is given to the picture number PN, said picture number PN becomes the smallest in the STRL. Therefore, as in the case of (malfunction example using picture number generation method example 1), L0 list and L1 list have states that are different from the state in the case of normal consecutive reproduction. As a result, a reference picture cannot be specified normally using a relative index Ind so that malfunction in which subsequent decoding is not performed correctly, is caused.

Accordingly, regarding the aforementioned problem, an object of the present invention is to provide an image decoding method for decoding a picture to be decoded with reference to appropriate pictures even in the case where random access reproduction is performed.

Means to Solve the Problems

In order to achieve the aforementioned object, an image decoding method according to the present invention is an image decoding method for decoding each of coded pictures in a stream with reference to a picture that is previously decoded and stored in a memory, the method including: a first storage step of sequentially decoding each of the coded pictures in the stream, storing, into the memory, a picture to be used as a reference from among the decoded pictures, and managing the picture stored in the memory; a determination step of determining whether or not random access reproduction has been designated; a state change step of changing a management state for managing the picture in the memory in the case where it is determined that random access reproduction has been designated in the determination step; and a second storage step of sequentially decoding each of the coded pictures from a random access reproduction destination with the management state changed in the state change step as an initial state, storing, into the memory, a picture to be used as a reference from among the decoded pictures, and managing the picture stored in the memory. For example, the coded pictures in the stream are divided into groups on an access unit basis, and in the determination step, it is determined whether or not random access reproduction starting from an access unit which is allowed to refer to a picture of another access unit has been designated. Furthermore, in the respective first and second storage steps, the picture to be used as a reference is managed by generating picture numbers for identifying each of the decoded pictures and assigning a picture number to each of the decoded pictures, and in the state change step, an offset value for generating the picture number is updated as the management state.

With the conventional technology, in the case where random access reproduction is designated, the offset value is not sometimes updated or is sometimes updated to an unnecessarily greater value so that an inappropriate picture is generated. Therefore, a picture to be stored into a memory cannot be appropriately managed using a corresponding picture number. Accordingly, in the image decoding method according to the present invention, in the case where random access reproduction is designated, a management state for managing a picture such as a previous offset value is changed and random access reproduction is performed with the changed management state as an initial state. Therefore, an appropriate picture number is generated and a picture to be stored into a memory can be correctly managed. As a result, each picture to be decoded from random access reproduction destinations can be decoded with reference to an appropriate picture. Accordingly, in the BD-ROM format standard using H.264 standard, both of normal reproduction and random access reproduction can be correctly performed.

Furthermore, in the first storage step, the offset value may be updated so that the offset value is increased every time when all the pictures included in a current access unit to be decoded are decoded, and a picture number for each of the decoded pictures may be generated using the offset value and a count value assigned to each of the decoded pictures in the stream on an access unit basis; in the state change step, the offset value may be updated so that the offset value is increased; and in the second storage step, with the offset value updated in the state change step as an initial state, the offset value may be updated so that the offset value is increased every time when all the pictures in a current access unit to be decoded are decoded, and a picture number for each of the decoded pictures from the random access reproduction destination may be generated using the count value and the offset value.

Accordingly, in the case where random access reproduction is designated, the offset value is updated to a significantly greater value as the offset value is increased every time when all pictures included in an access unit are decoded. Therefore, it can be prevented that a picture number of a current picture as a random access reproduction destination becomes smaller than the picture numbers of the pictures prior to the current picture, so that pictures stored in the memory can be correctly managed.

For example, in the respective first and second storage steps and state change step, the offset value is updated so that the offset value is increased at least by the maximum value of a count value assigned on an access unit basis.

Accordingly, it can be reliably prevented that the picture number of the current picture as a random access reproduction destination becomes smaller than the picture numbers of the pictures prior to the current picture.

Furthermore, in the respective first and second storage steps, the picture to be used as a reference may be managed by generating picture numbers for identifying each of the decoded pictures and assigning a picture number to each of the decoded pictures, and in the state change step, the management state may be updated by changing all the pictures stored in the memory to unreferenced pictures.

Accordingly, in the case where random access reproduction is designated, all pictures which are previously stored in the memory are changed to unreferenced pictures. Therefore, it can be prevented to cause instability in management based on picture numbers between a picture stored in the memory before the random access reproduction is performed and a picture to be stored into the memory after the random reproduction access reproduction is performed. As a result, each picture to be decoded from the random access reproduction destinations can be decoded with reference to an appropriate picture.

Furthermore, in the respective first and second storage steps, the picture to be used as a reference may be managed by generating picture numbers for identifying each of the decoded pictures and assigning a picture number to each of the decoded pictures; in the first storage step, an offset value for generating a picture number may be updated so that the offset value is increased every time when a count value of a current picture to be decoded is smaller than a count value of a picture decoded immediately before the current picture, and a picture number for each of the decoded pictures may be generated using the offset value and the count value assigned to each of the decoded pictures in the stream on an access unit basis; in the state change step, the offset value existing as the management state may be updated so that the offset value is decreased; and in the second storage step, with the offset value updated in the state change step as an initial state, the offset value may be updated so that the offset value is increased, every time when a count value of a current picture to be decoded is smaller than a count value of a picture decoded immediately before the current picture, and a picture number for each of the decoded pictures from the random access reproduction destination may be generated using the count value and the offset value. For example, in the state change step, the offset value is updated to 0.

With the conventional technology, in the case where random access reproduction is designated, an inappropriate picture number is generated by updating the offset value to an insignificantly greater value so that a picture to be stored into a memory cannot be appropriately managed using a corresponding picture number. Accordingly, in the image decoding method according to the present invention, in the case where random access reproduction is designated, previous offset values are changed to the smaller values, pictures in the memory are changed to unreferenced pictures, and random access reproduction is performed with the changed management state as an initial state. Therefore, an appropriate picture number is generated and the picture to be stored into the memory can be correctly managed. As a result, each picture to be decoded from the random access reproduction destinations can be decoded with reference to the appropriate picture. In other words, when random access reproduction is designated, the offset value is updated to a smaller value so that a generation of instability in management based on the picture number due to an abnormal increase in the picture number can be prevented.

Furthermore, further in the second storage step, in the case where there is an unreferenced picture in the memory, the unreferenced picture may be replaced with a reference permissible picture which is stored most recently.

Accordingly, further appropriate picture can be referred to.

Furthermore, further in the second storage step, a picture to be stored into the memory may be managed using start information based on a start of random access reproduction. For example, in the second storage step, a random access number which is to be updated every time when random access reproduction is started may be used as the start information.

With the conventional technology, the picture of the oldest display time is specified and deleted from the memory so that there is a problem that pictures are deleted even they are not displayed when many of the random access reproductions are designated. Accordingly, in the image decoding method according to the present invention, pictures that have not been displayed can be kept in the memory by managing the pictures using random access numbers.

Furthermore, the memory includes a first storage region and a second storage region, each having a different picture management mode, and further in the state change step, a size of the first storage region and a size of the second storage region may be changed complementarily according to a random access destination. For example, in the first storage region, an oldest picture which has been stored for a longest time is deleted when a new picture is stored, and in the second storage region, a designated picture is deleted when a new picture is stored.

Accordingly, it can be prevented that the size of the first storage region and the size of the second storage region differ for normal consecutive reproduction and random access reproduction, so that pictures to be stored into the memory can be correctly managed.

Furthermore, in the respective first and second storage steps, the picture to be used as a reference may be managed by generating picture numbers for identifying each of the decoded pictures and assigning a picture number to each of the decoded pictures, and in the state change step, a picture number of a picture stored in the memory may be changed to a picture number which is smaller than a picture number of a picture from the random access reproduction destination.

Accordingly, as described in the above, there is a state as if a picture that has not been decoded by random access reproduction is normally decoded and stored in the memory. As a result, each picture to be decoded from the random access reproduction destination can be decoded with reference to appropriate pictures.

Furthermore, in the state change step, the picture stored in the memory may be replaced with a dummy picture having a picture number which is smaller than the picture number of the picture from the random access reproduction destination. For example, the dummy picture is a picture which is not included in the stream or a picture decoded in the first storage step.

Accordingly, as described in the above, there is a state as if a picture that has not been decoded by random access reproduction is normally decoded and stored in the memory. As a result, each picture to be decoded from the random access reproduction destination can be decoded with reference to appropriate pictures.

It should be noted that the present invention can be realized as not only such image decoding method, but also as an image decoding apparatus and an integration circuit which operate using such method, a program for causing a computer to execute operations based on the method, and as a recording medium for storing such program.

Effects of the Invention

The image decoding method of the present invention has an effect that a picture to be coded can be decoded with reference to an appropriate picture even in the case of random access reproduction.

BRIEF DESCRIPTION OF DRAWINGS

FIG. 3A is a diagram for explaining a reference state between GOPs used in the conventional MPEG-2 and the like.

FIG. 3B is a diagram for explaining another reference state between GOPs used in the conventional MPEG-2 and the like.

FIG. 19 is a diagram for explaining a method of managing a reference picture list (STRL) according to the first variation of the second embodiment of the present invention.

FIG. 20A is a flowchart showing an operation that the memory management unit assigns a RAID number to a picture to which the RAID number is to be assigned, according to the first variation of the second embodiment of the present invention.

FIG. 20B is a flowchart showing an operation that the memory management unit selects a picture to be deleted from among pictures stored in the reference picture list, according to the first variation of the second embodiment of the present invention.

FIG. 21A is a diagram showing a state of a reference picture list according to a second variation of the second embodiment of the present invention.

FIG. 21B is a diagram showing other state of a reference picture list according to the second variation of the second embodiment of the present invention.

FIG. 21C is a diagram showing other state of the reference picture list according to the second variation of the second embodiment of the present invention.

FIG. 21D is a diagram showing other state of the reference picture list according to the second variation of the second embodiment of the present invention.

FIG. 21E is a diagram showing other state of the reference picture list according to the second variation of the second embodiment of the present invention.

FIG. 21F is a diagram showing other state of the reference picture list according to the second variation of the second embodiment of the present invention.

NUMERICAL REFERENCES

Figure 1A:
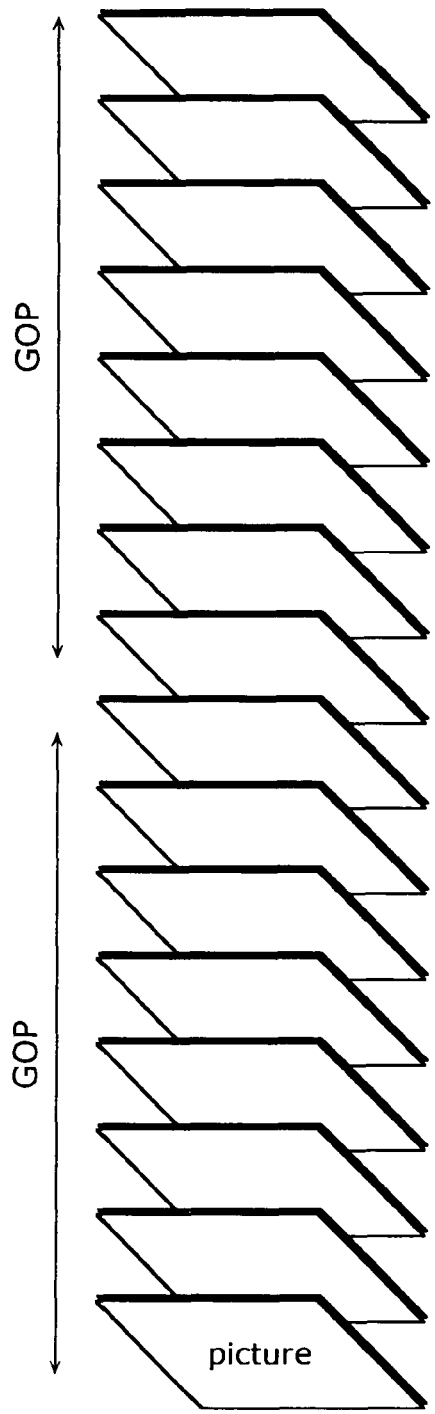
FIG. 1A is a diagram showing a configuration of a conventional MPEG-2 stream.
Figure 1B:
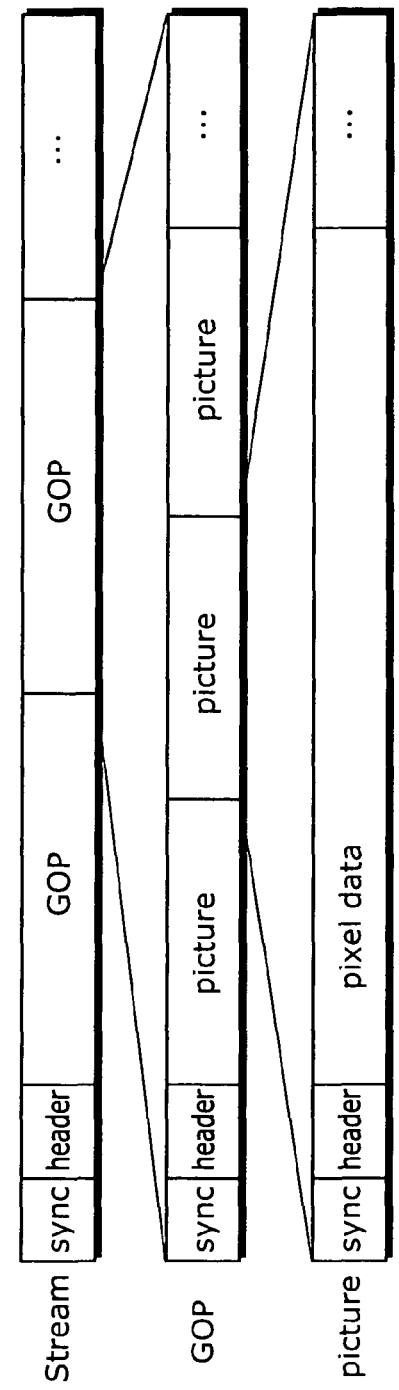
FIG. 1B is a diagram showing another configuration of the conventional MPEG-2 stream.
Figure 2:
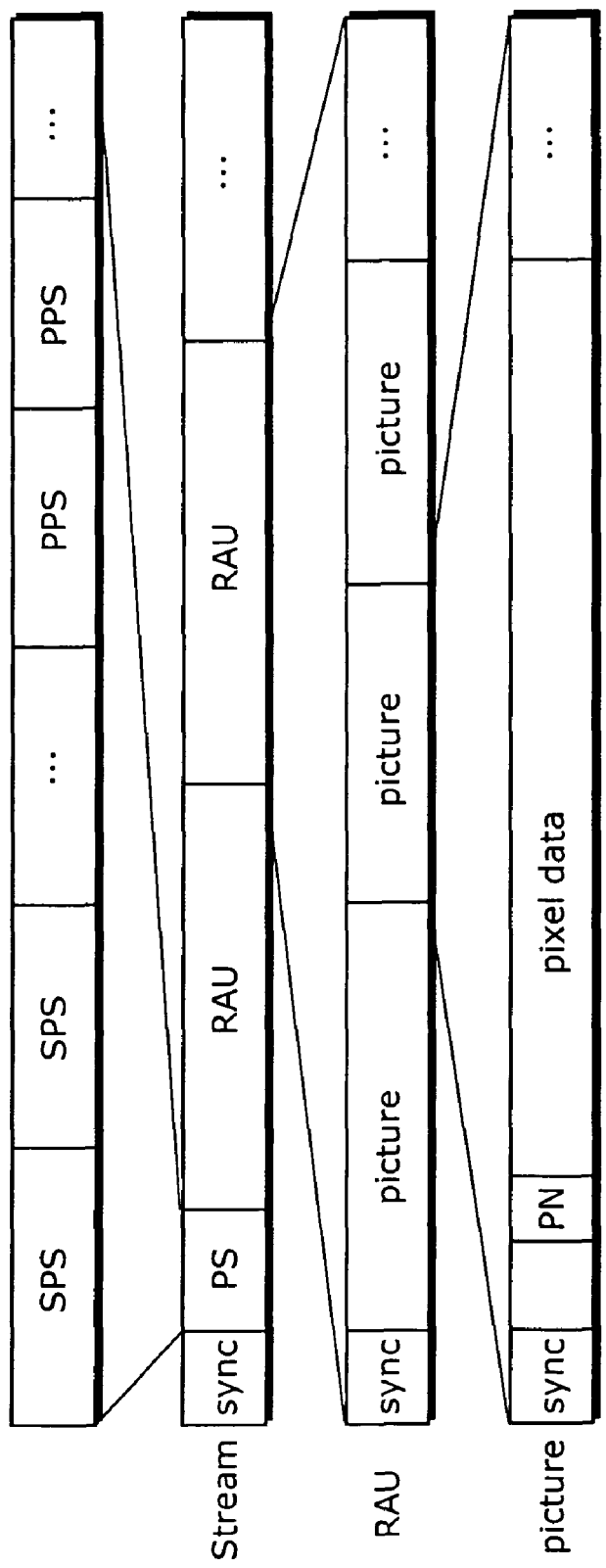
FIG. 2 is a diagram showing a configuration of other conventional stream.
Figure 3A:
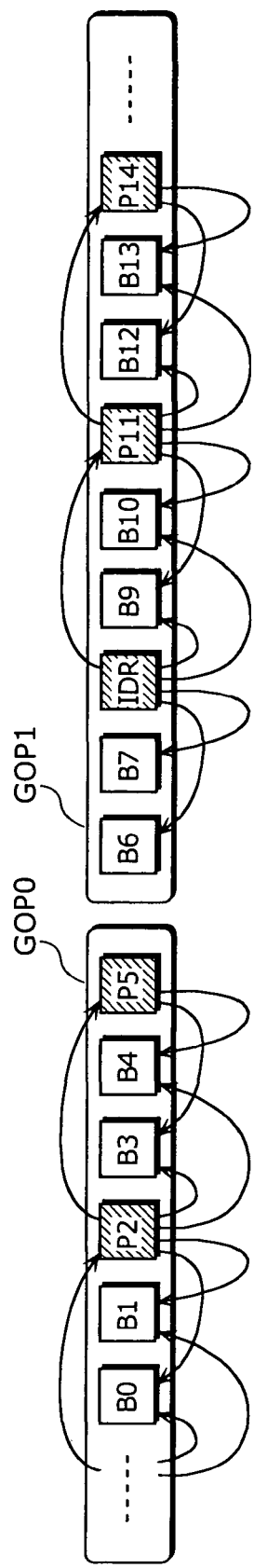
Figure 3B:
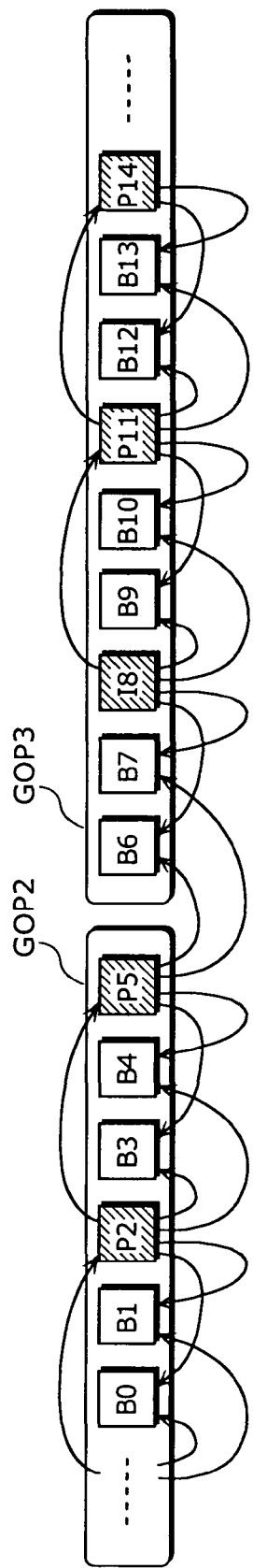
Figure 4:
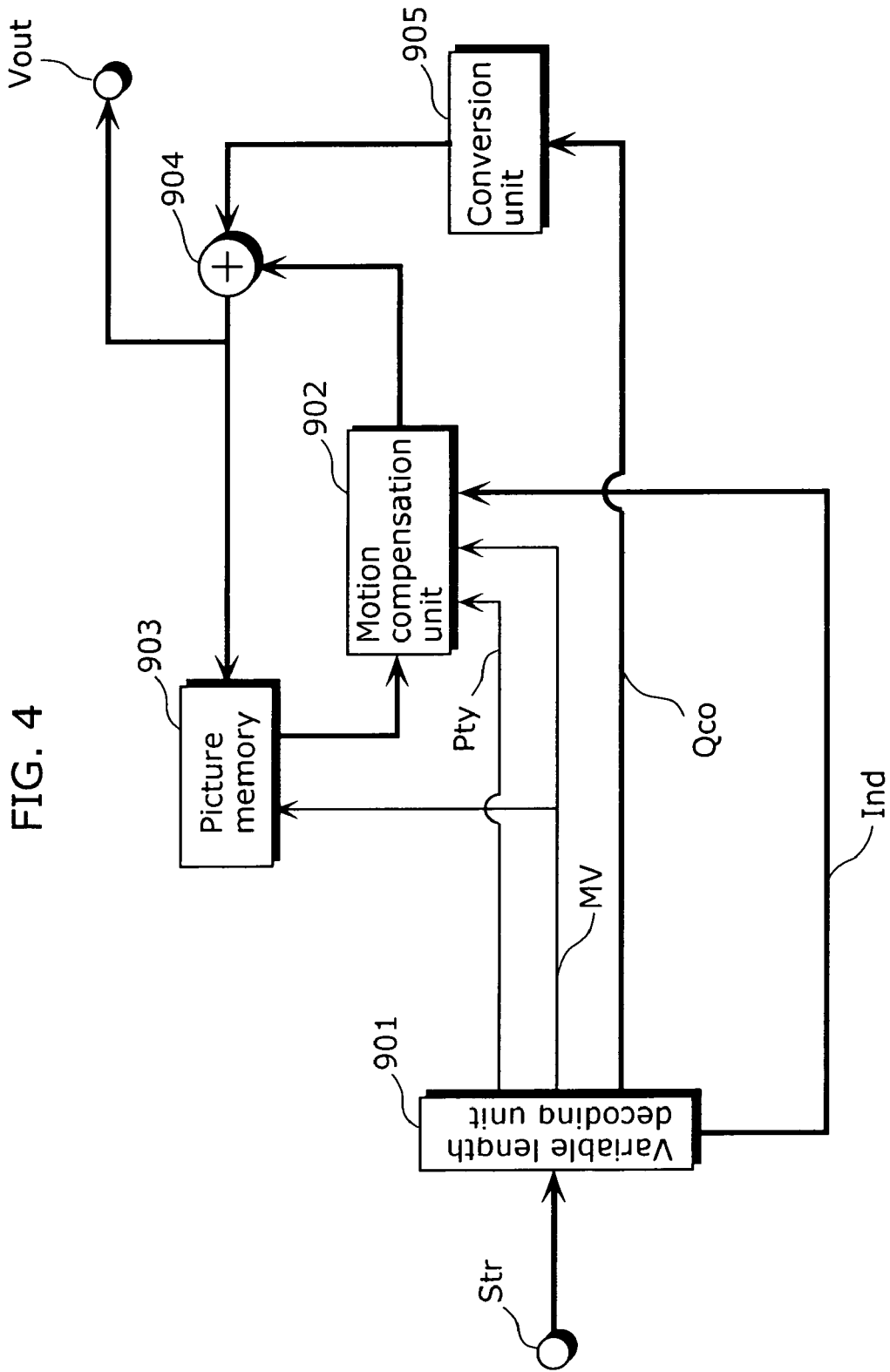
FIG. 4 is a block diagram of an image decoding apparatus which realizes a conventional image decoding method.

100 image decoding apparatus
101 variable length decoding unit
102 motion compensation unit
103 picture memory
104 adding unit
105 conversion unit
106 memory management unit
107 picture number generation unit
108 reproduction determination unit
Pic Picture
RAP Random Access Point
PN Picture Number
STRL Short Term Reference List
LTRL Long Term Reference List
RPL Reference Picture List
Str Stream
Qco Quantized Value
Ind Relative Index
Pty Picture Type
MV Motion Vector
Vout Reconstructed Picture

BEST MODE FOR CARRYING OUT THE INVENTION

Hereinafter, it shall be explained about an image decoding method of the present invention with reference to drawings.

First Embodiment

Figure 5:
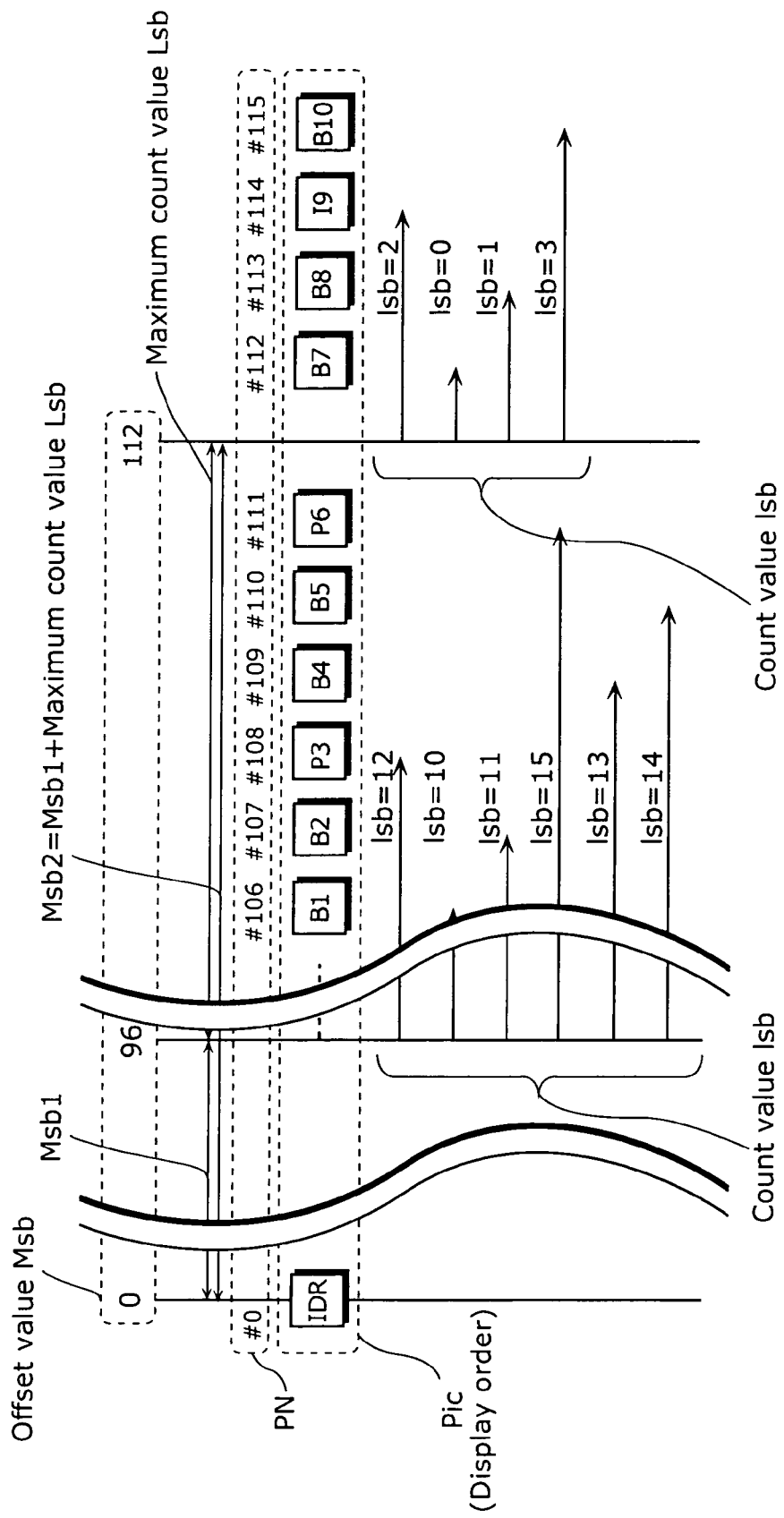
FIG. 5 is a diagram for explaining a picture number generation method example 1.

In an image decoding method according to the first embodiment of the present invention, a picture number is generated based on a picture number generation method example 1 shown in FIG. 5, and decodes each picture in a stream.

Figure 10:
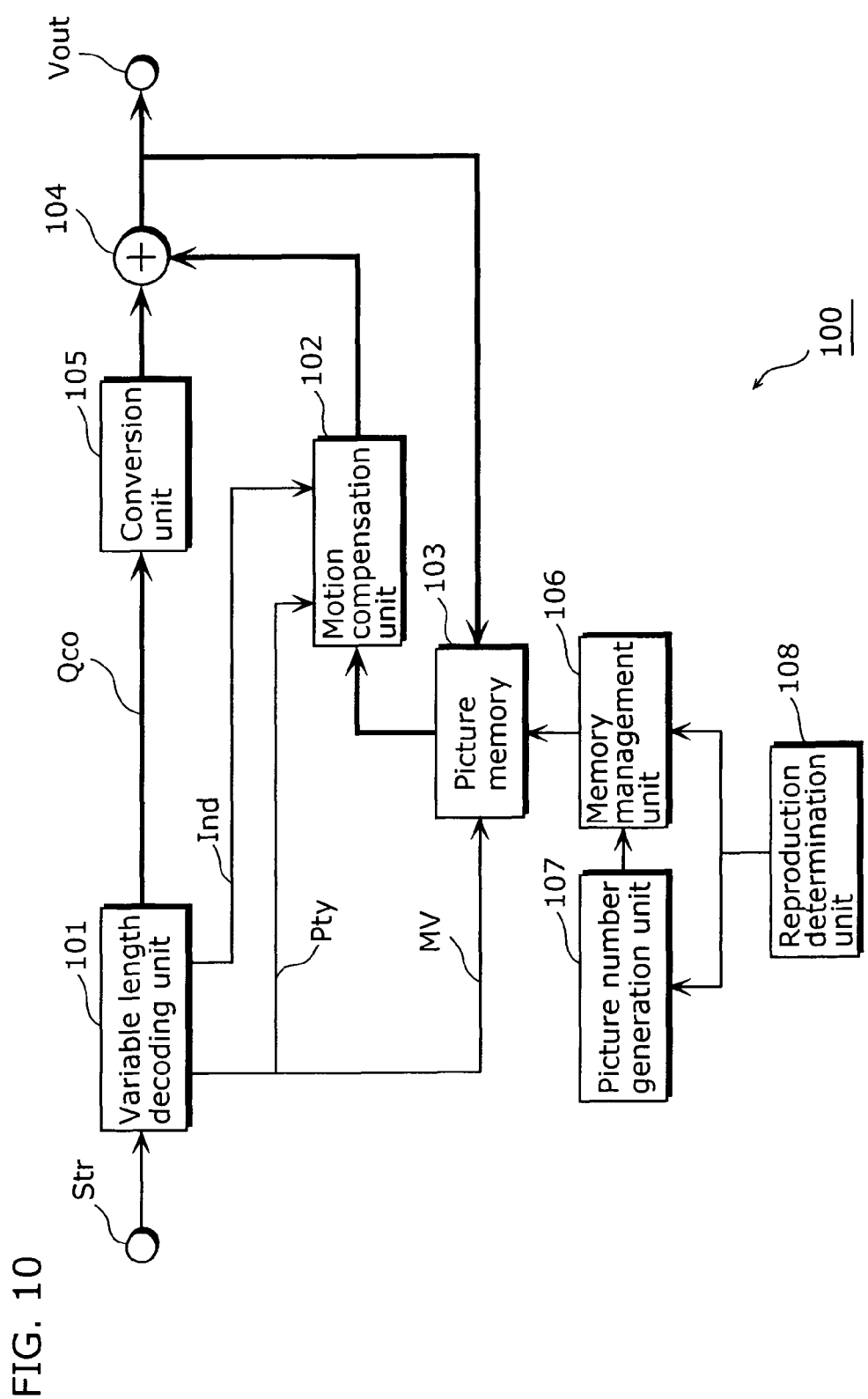
FIG. 10 is a block diagram of an image decoding apparatus which realizes an image decoding method according to the first embodiment of the present invention.

FIG. 10 is a block diagram of an image decoding apparatus which realizes the image decoding method according to the present embodiment.

An image decoding apparatus 100 according to the present embodiment includes a variable length decoding unit 101, a motion compensation unit 102, a picture memory 103, an adding unit 104, a conversion unit 105, a memory management unit 106, a picture number generation unit 107, and a reproduction determination unit 108.

The variable length decoding unit 101 decodes a stream Str, and outputs a quantized value Qco, a relative index Ind, a picture type Pty, and a motion vector MV. The quantized value Qco, the relative index Ind and the motion vector MV are respectively inputted to the picture memory 103, the motion compensation unit 102 and the conversion unit 105, and decoded thereby.

The conversion unit 105 inverse quantizes the quantized value Qco, reconstructs it to a frequency coefficient, further performs inverse frequency conversion on the frequency coefficient to obtain a pixel differential value, and outputs the pixel differential value to the adding unit 104.

The adding unit 104 adds the pixel differential value and the predictive picture outputted from the motion compensation unit 102, and generates a decoded picture Vout. The generated decoded picture Vout is stored into the picture memory 103. Herein, in order to use plural pictures as reference pictures, each block requires a reference number (a relative index Ind) for specifying an identification number of a picture to be referred to. Accordingly, reference pictures can be specified based on relative indexes Ind by taking a correspondence between the relative index Ind and the picture number of each picture stored in the picture memory 103.

The motion compensation unit 102 extracts an optimum image region for the predictive image from the decoded picture stored in the picture memory 103 using the motion vector and the relative index Ind detected as the result of the aforementioned process. The motion compensation unit 102 then generates the aforementioned predictive image and outputs it to the adding unit 104.

The reproduction determination unit 108 determines a reproduction format. Specifically, when a sequence is reproduced, the reproduction determination unit 108 determines whether or not to perform normal consecutive reproduction or random access reproduction from a random access point RAP having an Open GOP structure. For example, the reproduction determination unit 108 determines a reproduction format in accordance with an instruction from a system control positioned at an upper hierarchy of the image decoding apparatus. The reproduction determination unit 108 also determines, in the case where a GOP of the random access point RAP includes an IDR picture, that said GOP has a Closed GOP structure, and determines, in the case where the GOP does not include an IDR picture, that said GOP has an Open GOP structure. It should be noted that it is possible to estimate a reproduction format from a result of tracing the decoding of frame numbers fn assigned to respective pictures. Furthermore, the normal consecutive reproduction includes random access reproduction from the Closed GOP.

The reproduction determination unit 108 outputs a reproduction determination signal indicating such determination result.

The picture number generation unit 107 obtains a reproduction determination signal from the reproduction determination unit 108, generates a picture number based on the reproduction format (normal consecutive reproduction or random access reproduction) indicated by the obtained reproduction determination signal, and outputs the picture number.

The memory management unit 106 manages a picture to be stored into the picture memory 103 using the reproduction determination signal outputted from the reproduction determination unit 108 and the picture number outputted from the picture number generation unit 107.

Figure 11:
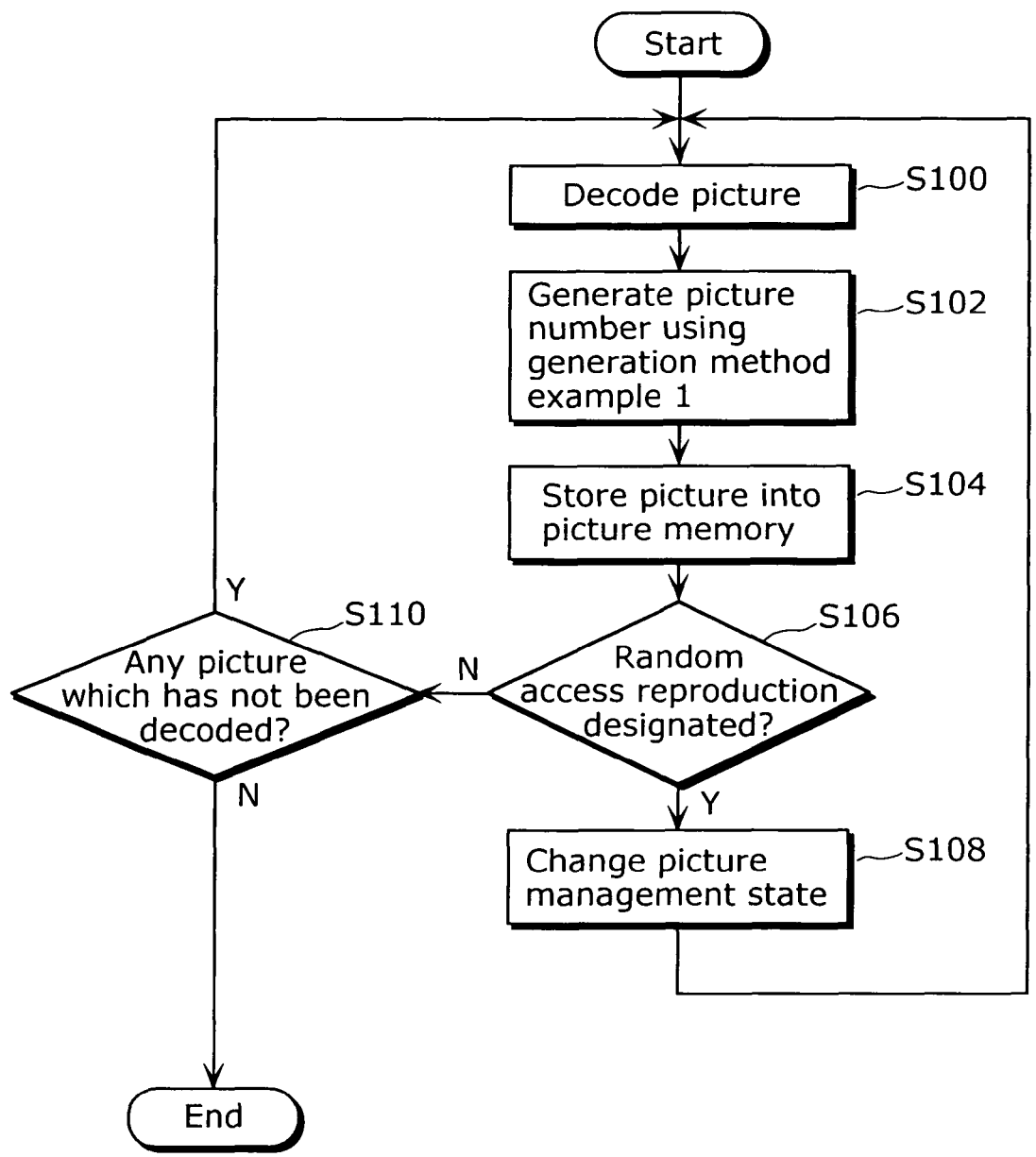
FIG. 11 is a flowchart showing an example of operations by the image decoding apparatus according to the first embodiment of the present invention.

FIG. 11 is a flowchart which shows an example of operations by the image decoding apparatus 100.

First, when reproduction of a stream Str is started, the image decoding apparatus 100 decodes a current picture to be decoded which is positioned at a start position (Step S100), and generates a picture number for the current picture based on the generation method example 1 (Step S102). The image decoding apparatus 100 then assigns the generated picture number to the current picture, and stores the current picture into the picture memory 103 (Step S104). Next, the image decoding apparatus 100 determines whether or not random access reproduction is designated (Step S106), and when determining that random access reproduction is designated (Y in Step S106), changes a management state of the picture (Step S108). The image decoding apparatus 100 then repeatedly executes the processes from Step S100 to the pictures as the random access reproduction destinations. Specifically, the image decoding apparatus 100 sequentially decodes each picture from the random access reproduction destination when the changed management state as an initial state, stores pictures to be used as references into the picture memory 103, and manages them.

On the other hand, when determining that random access reproduction is not specified in Step S106 (N in Step S106), the image decoding apparatus 100 determines whether or not there is a not-yet-decoded picture along with the sequence reproduction (Step S110). When determining that there is a not-yet-decoded picture (Y in Step S110), the image decoding apparatus 100 repeatedly executes processes from Step S100 to the yet-to-be decoded picture. On the other hand, when determining that there is no not-yet-decoded picture (N in Step S110), reproduction processing of the stream Str is terminated.

Figure 12:
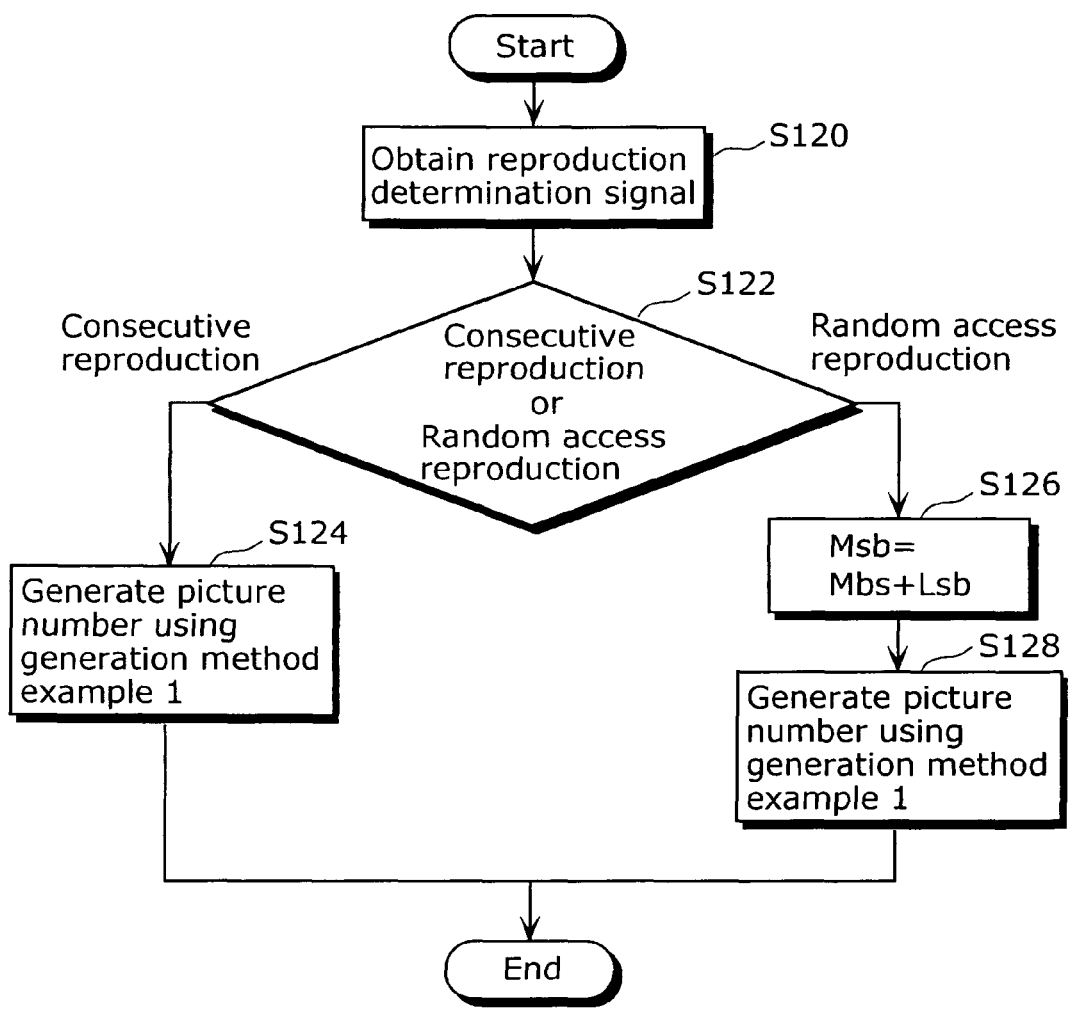
FIG. 12 is a flowchart showing operations by an image number generation unit according to the first embodiment of the present invention.

FIG. 12 is a flowchart showing operations by the picture number generation unit 107.

As shown in FIG. 12, the picture number generation unit 107 obtains a reproduction determination signal from the reproduction determination unit 108 (Step S120), and determines, based on the obtained reproduction determination signal, whether or not a reproduction format to be designated is normal consecutive reproduction or random access reproduction from a random access point RAP of the Open GOP structure (Step S122).

Here, when determining that normal consecutive reproduction is designated in Step S122, the picture number generation unit 107 generates a picture number using the generation method example 1.

On the other hand, when determining that random access reproduction is designated in Step S122, the picture number generation unit 107 adds a maximum count value Lsb to the offset value Msb, and updates the offset value Msb (Step S126). The picture number generation unit 107 then generates, for a picture of the random access point RAP, a picture number PN obtained by adding the updated offset value Msb and the count value Isb of the picture, based on the generation method example 1 (Step S128).

Accordingly, in the present embodiment, the management state of a picture is changed when random access reproduction is performed. Specifically, the picture number PN at the time of the start of random access reproduction is set to be a value greater than any picture number PN of pictures Pic that are already included in the STRL, by adding the maximum count value Lsb to the offset value Msb so as to update the offset value Msb. Consequently, occurrence of malfunction can be prevented.

Note that whereas, in the present embodiment, an offset value Msb is updated by adding the maximum count value Lsb to the offset value Msb, the picture number PN at the time of the start of random access reproduction may be set to a value which is greater than any picture number PN of the pictures Pic that are already included in the STRL.

Figure 13:
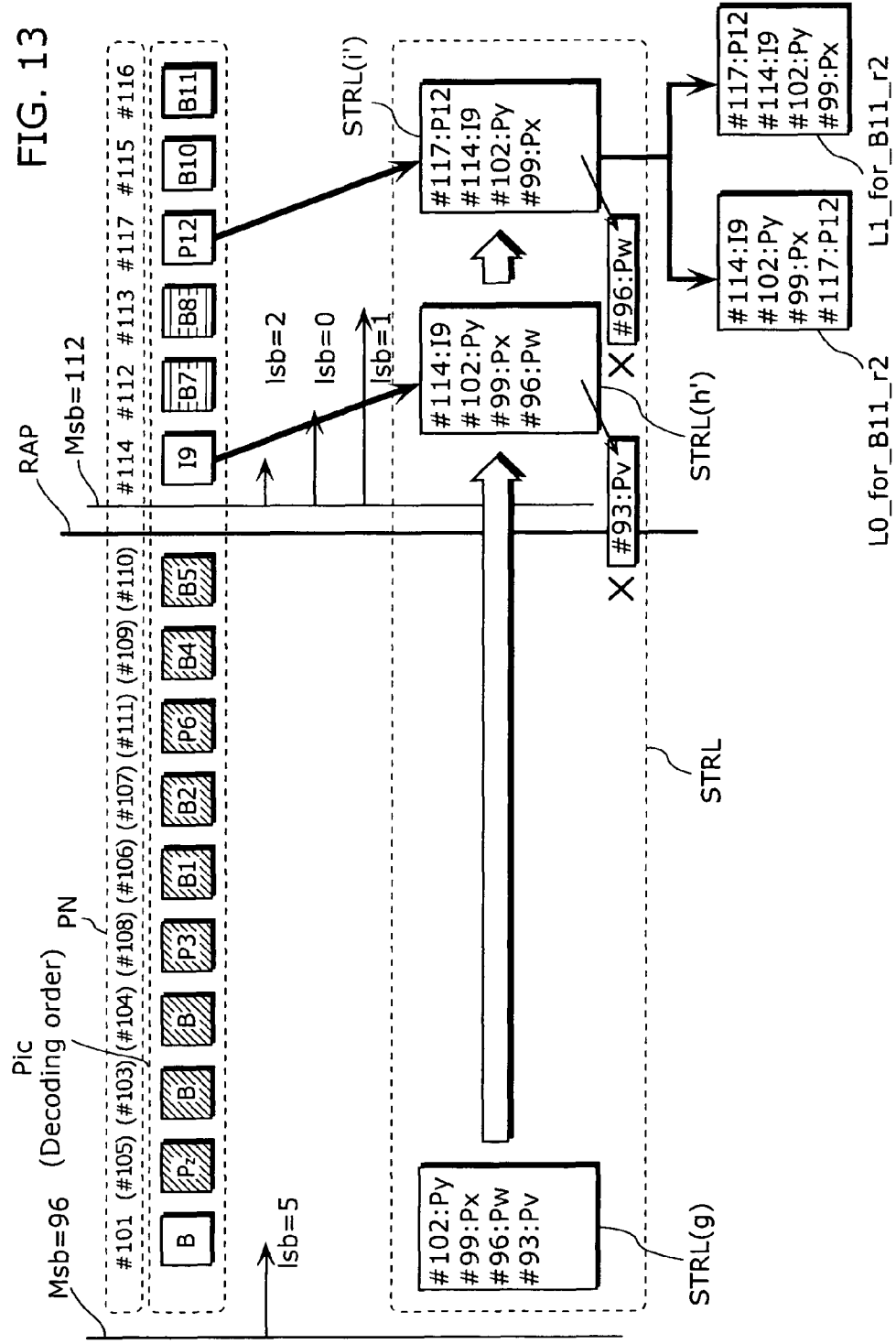
FIG. 13 is a diagram for explaining a state of a picture memory according to the first embodiment of the present invention.

FIG. 13 is a diagram for explaining a state of the picture memory 103 managed according to the present embodiment.

First, when a picture I9 is decoded due to occurrence of skipping (random access reproduction) after a picture B having a picture number of 101 is decoded, the offset value Msb is updated to 96+16=112. Next, Msb+Isb=112+2=114 is generated as a picture number PN for the picture I9. As a result, the reference picture list is updated to a state of STRL (h'), and consecutively updated to a state of STRL (i') after a picture P12 is decoded. Furthermore, a picture B10 and a picture B11 are consecutively decoded.

Herein, the picture number PN of the picture P12 is the largest in the STRL (a reference picture list), and the picture number PN of the picture IP is the second largest. Therefore, an L0 list (L0_for_B11_r2) and an L1 list (L1_for_B11_r2) shown in FIG. 13 are generated. As a result, the picture I9 and the picture P12, which conventionally could not specified with the same relative index Ind used for normal consecutive reproduction, can be specified.

Figure 8:
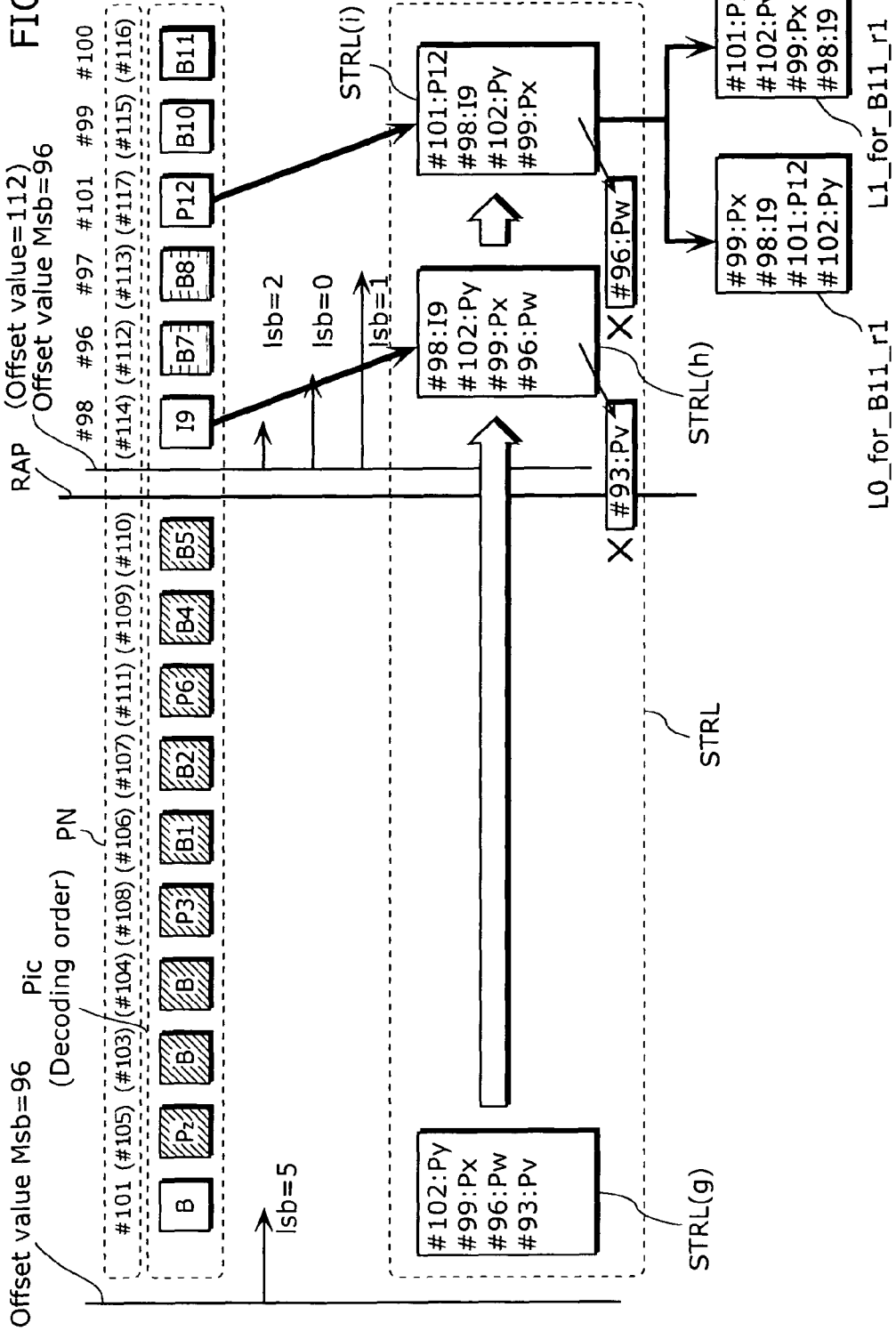
FIG. 8 is a diagram for explaining an example of causing malfunction using a list managed by the image number generation method example 1.

As described in the above, in the present embodiment, when random access reproduction is performed, the offset value Msb is updated at first so that the offset value Msb is forcedly increased, and the management state of the picture is changed. Accordingly, it can be prevented that the picture number of a picture after the random access reproduction is performed as shown in FIG. 8 becomes smaller than the picture number of the picture before the random access reproduction is performed. Consequently, occurrence of management instability based on the picture numbers PN of pictures listed on the reference picture list is prevented, and as similar to the case of normal consecutive reproduction, a picture to be decoded can be decoded with reference to appropriate pictures using relative indexes Ind.

(First Variation)

Here, it shall be explained about a variation of the picture management state change according to the present embodiment.

In the present embodiment, when random access reproduction is designated, the picture management state is changed by updating the offset value Msb. On the other hand, in the present variation, all pictures stored in the picture memory 103 as references are changed to unreferenced pictures.

Accordingly, only the pictures, which have been decoded since the time of start of random access reproduction, are stored into the picture memory 103. Therefore, occurrence of confusion between pictures stored before the start of random access reproduction and pictures stored after the start of random access reproduction can be prevented. Furthermore, the picture number PN is not forcibly increased at the time of random access reproduction so that it does not exceed the manageable maximum value (Maximum Picture Number MPN) of the picture number PN. Thus, occurrence of malfunction due to an increase of the picture number PN can be prevented.

Here, special process may be further performed in the generation of an L0 list.

Figure 14:
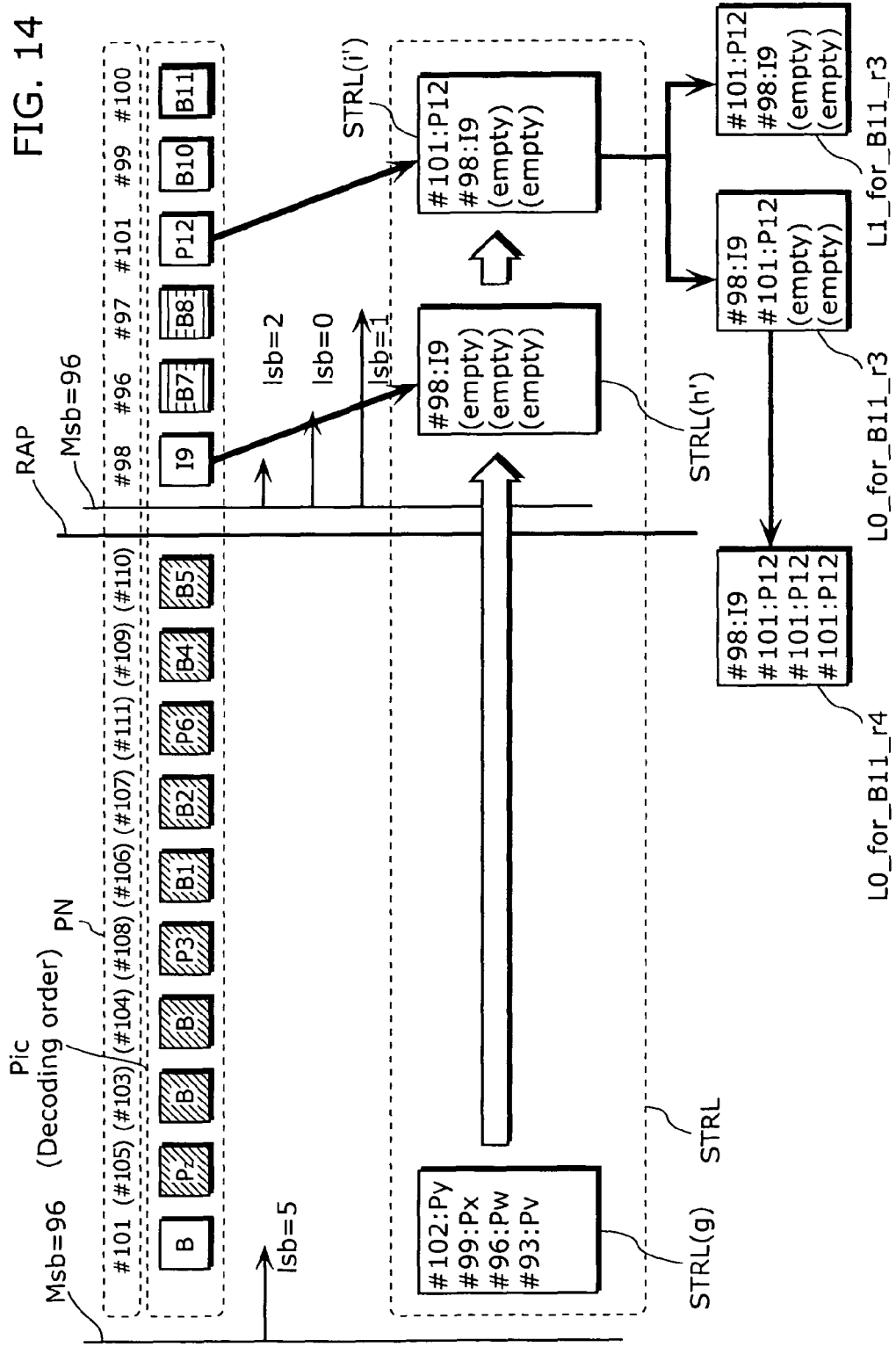
FIG. 14 is a diagram for explaining a method of generating an L0 list according to a first variation of the first embodiment of the present invention.

FIG. 14 is a diagram for explaining a method of generating an L0 list.

First, when skipping (random access reproduction) is occurred and a picture I9 is decoded after the picture B having the picture of number 101 is decoded, all pictures on the reference picture list (STRL) are turned into unreferenced pictures. Specifically, pictures stored in the reference picture list are deleted as pictures for references, and the regions in which the deleted pictures had been stored become empty. Next, in accordance with the generation method example 1, Msb+Isb=96+2=98 is generated as a picture number PN for the picture I9. As a result, the reference picture list is updated to a state of STRL (h') and then updated to a state of STRL (i') after the picture P12 is decoded. Furthermore, the picture B10 and the picture B11 are consecutively decoded.

From the reference picture list in the state of such STRL (i'), an L0 list (L0_for_B11_r3) and an L1 list (L1_for_B11_r3) are generated using a method determined by the aforementioned standard.

Furthermore, the L0 list (L0_for_B11_r3) is updated to an L0 list (L0_for_B11_r4) by consecutively inserting, into the empty regions, pictures that are the same as the picture having the picture number PN which is lastly added.

Accordingly, a desired picture can be appropriately selected as a reference picture from the L0 list even in the case of random access reproduction, by inserting a picture into the empty region.

Figure 7:
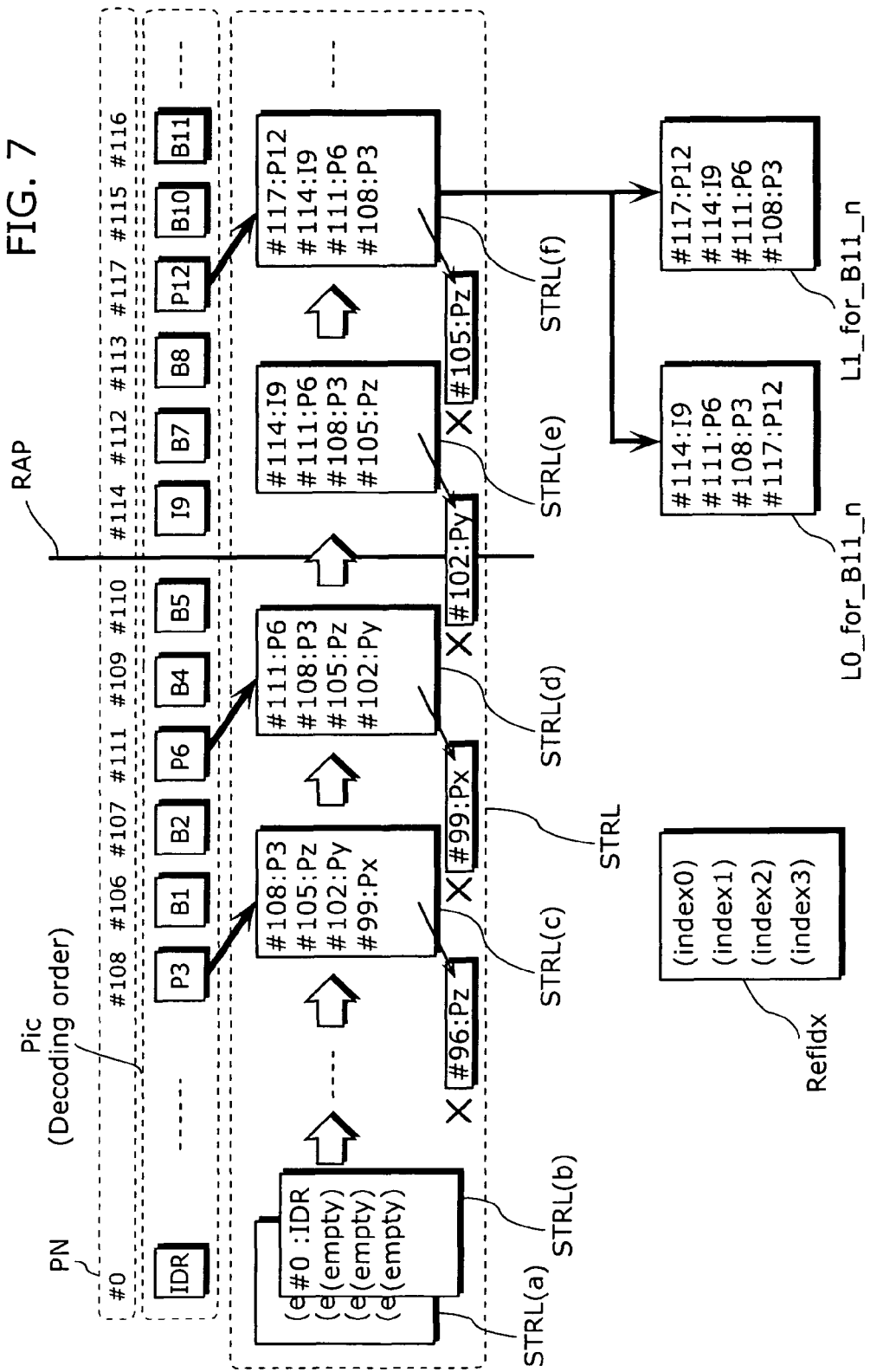
FIG. 7 is a diagram for explaining an STRL management method using the image number generation method example 1.

For example, assuming the case where the picture B11 refers to a preceding picture I9 and a subsequent picture P12. In this case, in order to refer to these pictures I9 and P12, a 0th relative index (Index0) may be specified for the L0 list (L0_for_B11_r4) and a 0th relative index (Index0) may be specified for the L1 list (L1_for_B11_r3), as similar to the case of normal consecutive reproduction shown in FIG. 7.

Furthermore, for example, it is assumed the case where the picture B11 refers to two pictures which are subsequent to the picture P12. In this case, in the normal consecutive reproduction shown in FIG. 7, it is necessary to specify the third relative index (Index3) for the L0 list (L0_for_B11_n) in order to refer to the picture P12.

Here, if the empty region is kept empty without updating the L0 list (L0_for_B11_r3), the picture P12 cannot be referred to even when the third relative index (Index3) is specified for the L0 list (L0_for_B11_r3). Therefore, the L0 list (L0_for_B11_r3) is updated to the L0 list (L0_for_B11_r4). Specifically, the picture P12, which is stored immediately before the picture B11, is inserted into the empty region on the L0 list (L0_for_B11_r3). Accordingly, the picture P12 can be referred to by specifying the third relative index (Index3) as is the same in the case of normal consecutive reproduction shown in FIG. 7. Furthermore, by thus filling the empty region on the L0 list, the picture P12 can be normally referred to even in the case where any one of first to third relative indexes Ind is specified.

(Second Variation)

Here, it shall be explained about other variation regarding the management state change of a picture according to the present embodiment.

In the present embodiment, when random access reproduction is designated, the picture management state is changed by updating the offset value Msb. On the other hand, in the present variation, the picture management state is changed by inserting, into the STRL, dummy pictures having picture numbers which are smaller than a picture number of a picture from the random access reproduction destination as many as the number of reference-permissible pictures.

Accordingly, it looks as if pictures which were not decoded because of random access are normally decoded and stored into the picture memory 103. As a result, each picture to be decoded from the random access reproduction destination can be decoded with reference to appropriate pictures.

Figure 15:
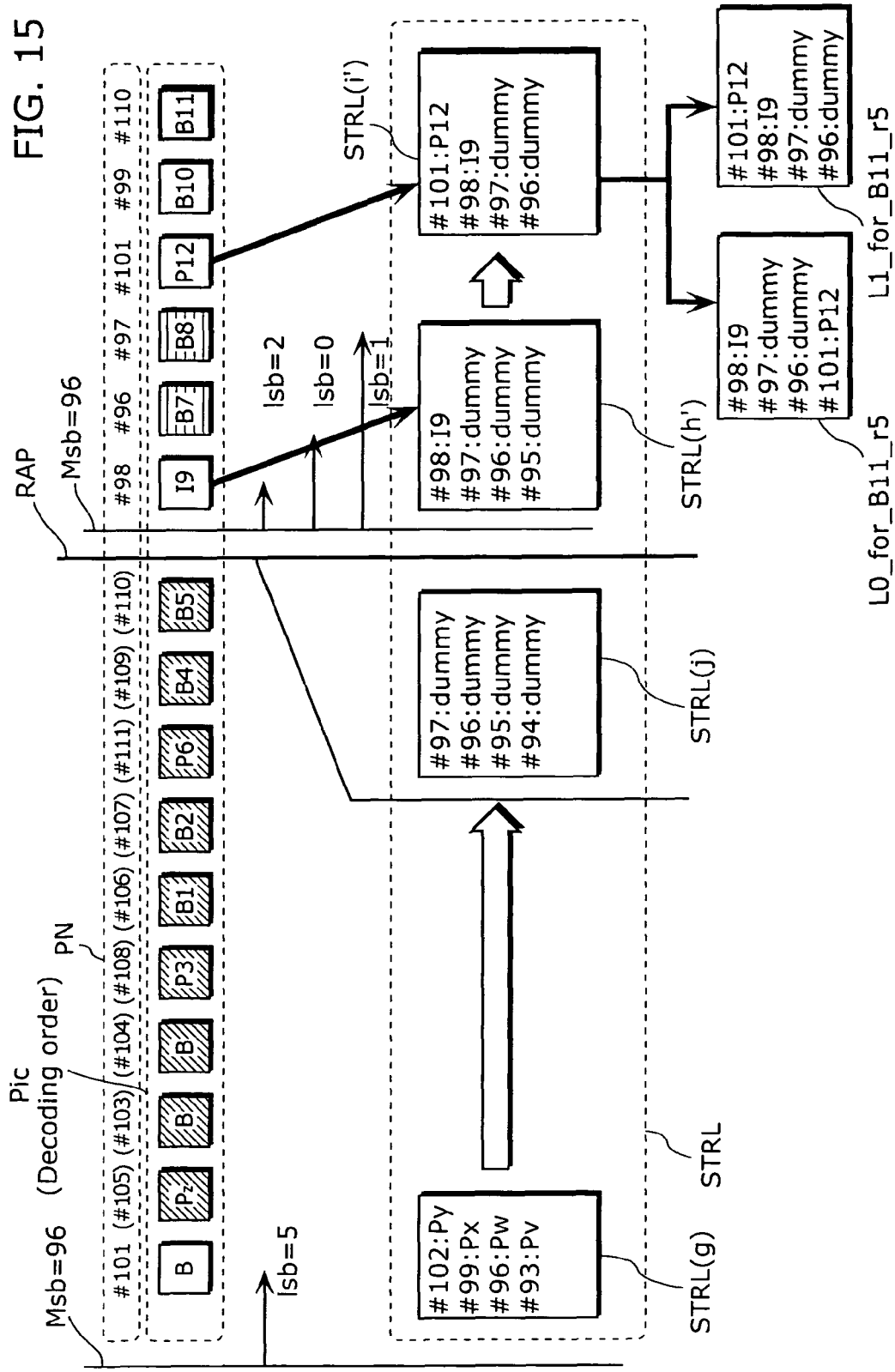
FIG. 15 is a diagram for explaining a method of generating an L0 list and an L1 list according to a second variation of the first embodiment of the present invention.

FIG. 15 is a diagram for explaining a method of generating an L0 list and an L1 list according to the present variation.

First, after decoding the picture B having the picture number 101, when skipping (random access reproduction) is occurred, a picture number PN to be assigned to the picture I9 is calculated before decoding the picture I9. For example, in accordance with the generation method example 1, Msb+Isb=96+2=98 is calculated as the picture number PN for the picture I9. Then, dummy pictures having picture numbers PN that are smaller than the picture number PN of the picture I9 are inserted into the reference picture list (STRL) as many as the number of reference-permissible pictures. As a result, the reference picture list becomes a state of STRL (j). In other words, a picture Py having the picture number of 102 is replaced with a dummy picture having the picture number of 97, and a picture Px having the picture number of 99 is replaced with a dummy picture having the picture number of 96. Furthermore, a picture Pw having the picture number of 96 is replaced with a dummy picture having the picture number of 95, and a picture Pv having the picture number of 93 is replaced with a dummy picture having the picture number of 94.

Here, the aforementioned dummy pictures are not actually used as reference pictures in the subsequent decoding process so that they may be pictures, which are not included in the stream Str, to which picture numbers which are smaller than the picture number of a picture as the random access reproduction destination are assigned. For example, such dummy pictures are pictures having pixel values, all of which are predetermined values (for example, 0), or pictures which do not have any pixel value. Furthermore, the dummy pictures may be pictures that have been already decoded from among the pictures in the stream Str. For example, the dummy picture is a picture that has been decoded immediately before a current picture to be decoded. Note that, instead of replacing a picture stored in the reference picture list, only the picture number of said picture may be changed to a picture number that is smaller than the picture number of a picture as the random access reproduction destination.

Next, when the picture I9 is decoded, the reference picture list is updated to a state of STRL (h'), and then the reference picture list is updated to a state of STRL (i') continuously after the decoding of the picture P12. Furthermore, the picture B10 and the picture B11 are consecutively decoded.

From such reference picture list in the state of STRL (i'), an L0 list (L0_for_B11_r5) and an L1 list (L1_for_B11_r5) are generated using the method defined by the aforementioned standard.

Accordingly, by inserting dummy pictures, desired pictures can be more appropriately selected as reference pictures from the L0 list even in the case where random access reproduction is performed.

For example, it is assumed a case where the picture B11 refers to a preceding picture I9 and a subsequent picture P12. In this case, in order to refer to these pictures I9 and P12, the 0th relative index (Index0) may be specified for the L0 list (L0_for_B11_r5) and the 0-th relative index (Index0) may be specified for the L1 list (L1_for_B11_r5), as in the case of normal consecutive reproduction shown in FIG. 7.

Furthermore, for example, it is assumed the case where the picture B11 refers to two pictures subsequent to the picture P12. In this case, in the normal consecutive reproduction shown in FIG. 7, in order to refer to the picture P12, the third relative index (Index3) is required to be specified for the L0 list (L0_for_B11_n). As totally similar to that case, the picture P12 can be referred to by specifying the third relative index (Index3) for the L0 list (L0_for_B11_r5).

Second Embodiment

Figure 6:
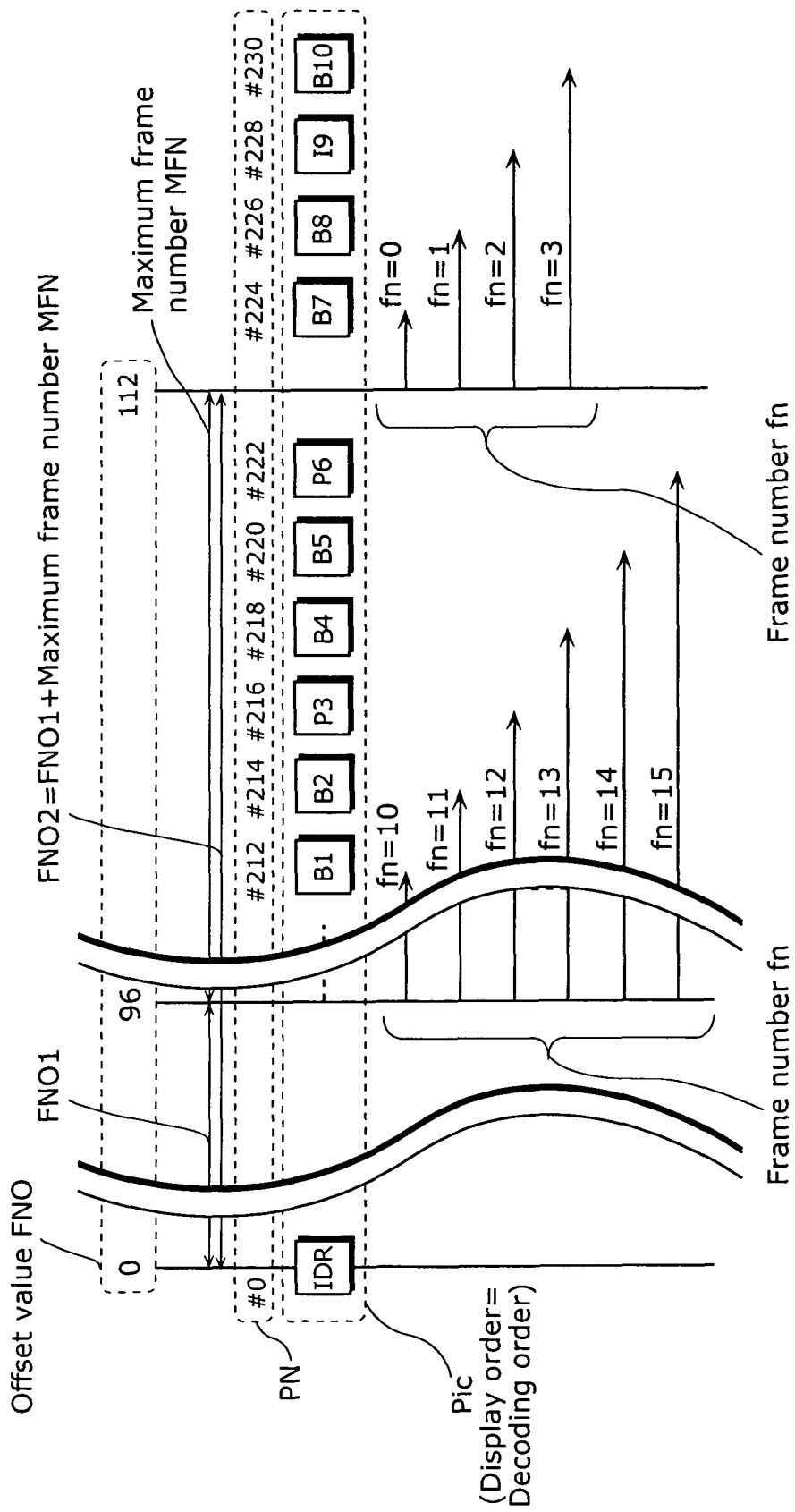
FIG. 6 is a diagram for explaining a picture number generation method example 2.

In the image decoding method according to a second embodiment of the present invention, each picture included in a stream is decoded by generating a picture number based on the picture number generation method example 2 shown in FIG. 6.

Figure 16:
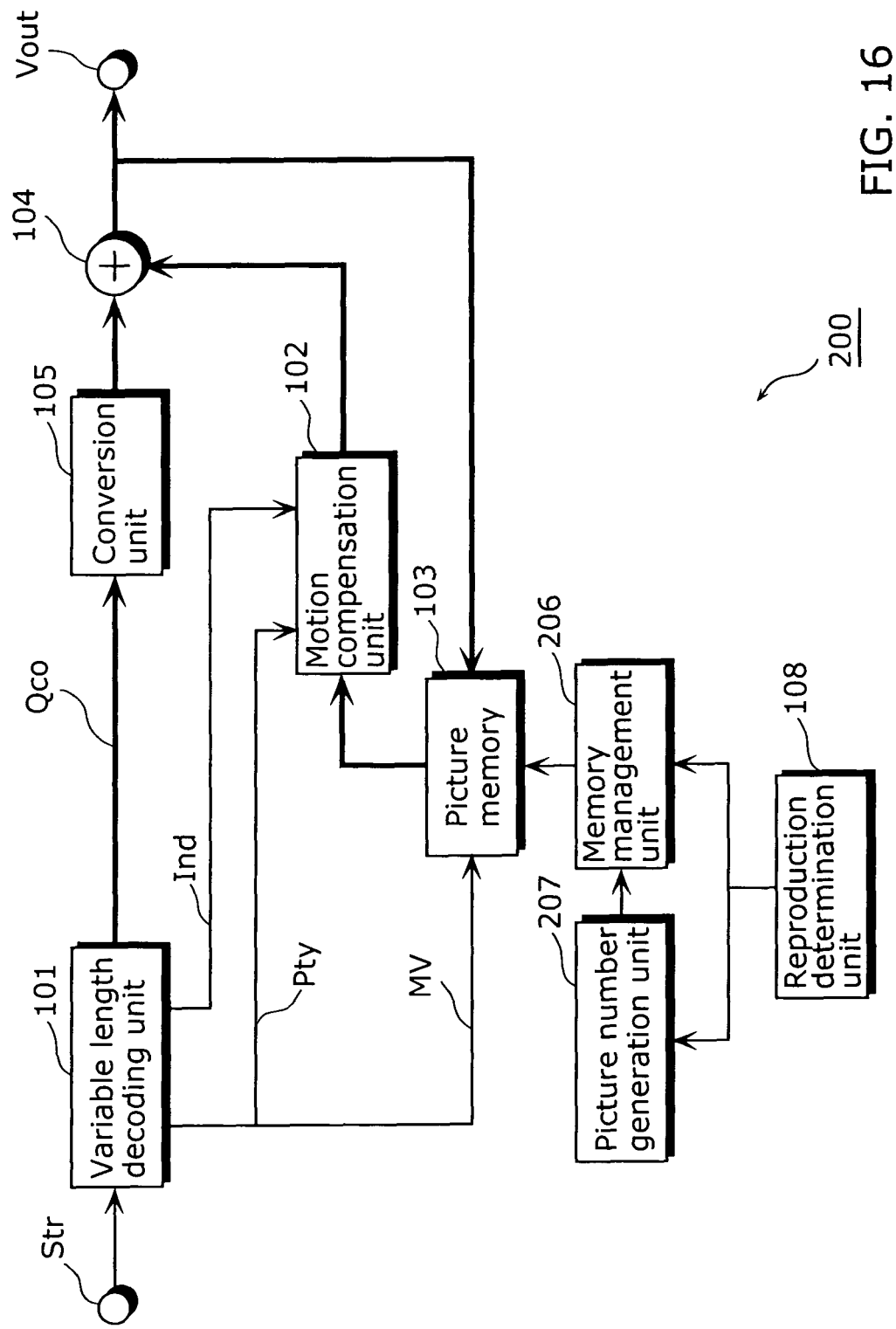
FIG. 16 is a block diagram of an image decoding apparatus which realizes an image decoding method according to a second embodiment of the present invention.

FIG. 16 is a block diagram showing an image decoding apparatus which realizes an image decoding method according to the present embodiment.

An image decoding apparatus 200 according to the present embodiment includes a variable length decoding unit 101, a motion compensation unit 102, a picture memory 103, an adding unit 104, a conversion unit 105, a memory management unit 206, a picture number generation unit 207, and a reproduction determination unit 108.

Note that, same reference numbers as used in the first embodiment are attached to indicate functional blocks of the image decoding apparatus 200 of the present embodiment which are the same as those included in the image decoding apparatus 100 according to the first embodiment, and detailed explanations about the same functional blocks are omitted.

The picture number generation unit 207 obtains a reproduction determination signal from the reproduction determination unit 108, generates a picture number based on a reproduction format (normal consecutive reproduction or random access reproduction) indicated by the reproduction determination signal, and outputs the generated picture number.

The memory management unit 206 manages the picture stored in the picture memory 103, using the reproduction determination signal outputted from the reproduction determination unit 108 and the picture number outputted from the picture number generation unit 207.

Figure 17:
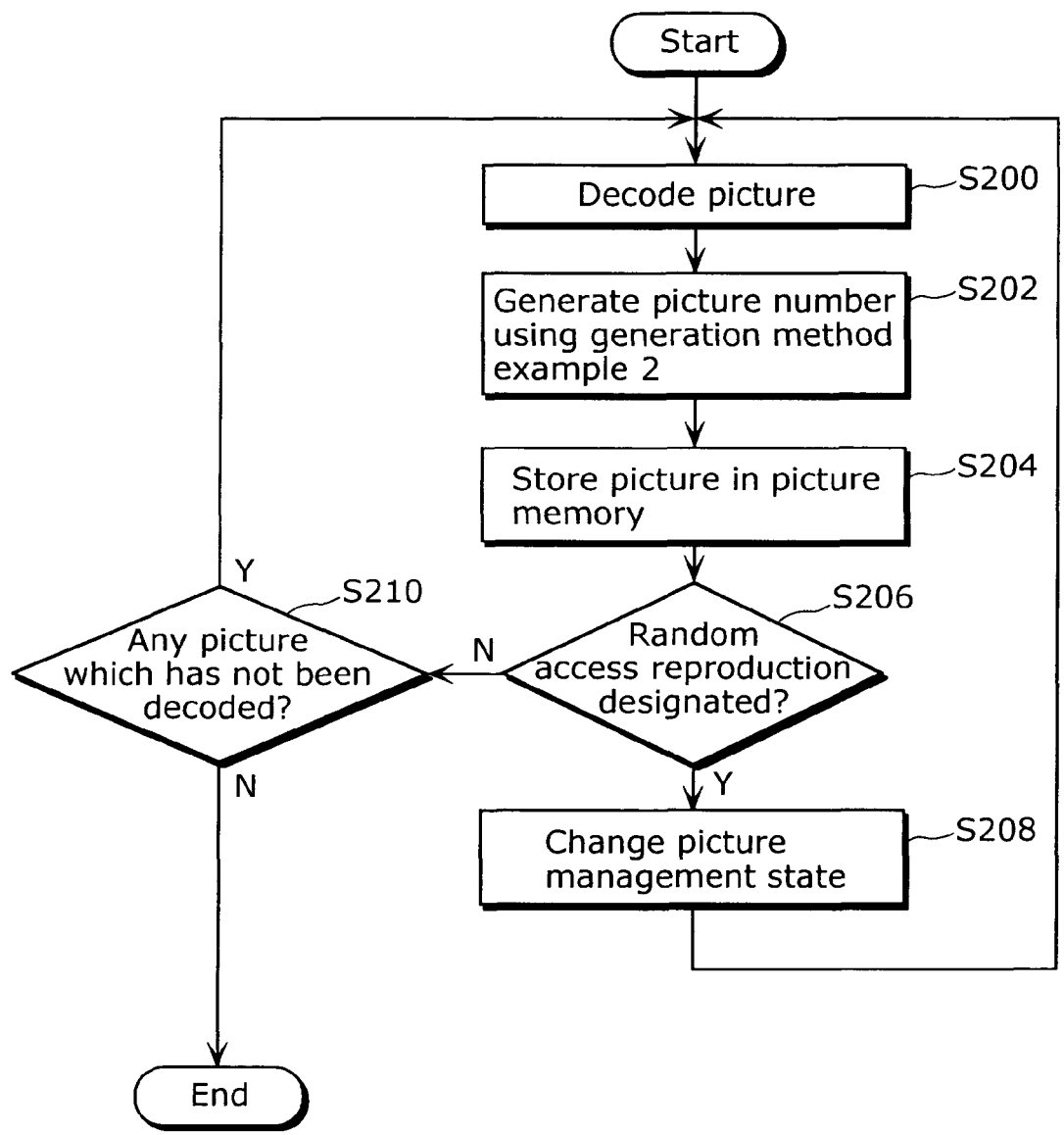
FIG. 17 is a flowchart showing an example of operations by the image decoding apparatus according to the second embodiment of the present invention.

FIG. 17 is a flowchart showing an example of operations by the image decoding apparatus 200.

First, when reproduction process of a stream Str is started, the image decoding apparatus 200 decodes a current picture to be decoded which is located at a start position (Step S200), and generates a picture number for the current picture based on the generation method example 2 (Step S202). The image decoding apparatus 200 then assigns the generated picture number to the current picture, and stores the current picture into the picture memory 103 (Step S204). Next, the image decoding apparatus 200 determines whether or not random access reproduction is designated (Step S206), and when determining random access reproduction is designated (Y in Step S206), changes a picture management state using a method which is different from that in the first embodiment (Step S208). The image decoding apparatus 200 then repeatedly executes processes from Step S200 to pictures as the random access reproduction destinations. Specifically, the image decoding apparatus 200 sequentially decodes each picture from the random access reproduction destination when the changed management state as an initial state, stores pictures used as references into the picture memory 103, and manages them.

On the other hand, when determining that random access reproduction is not designated in Step S106 (N in Step S206), the image decoding apparatus 100 determines whether or not there is a not-yet-decoded picture along with the sequence reproduction (Step S210). When determining that there is a not-yet-decoded picture (Y in Step S210), the image decoding apparatus 200 repeatedly executes processes from Step S200 to the not-yet-decoded picture. On the other hand, when determining that there is no not-yet-decoded picture (N in Step S210), reproduction processing of the stream Str is terminated.

Figure 18:
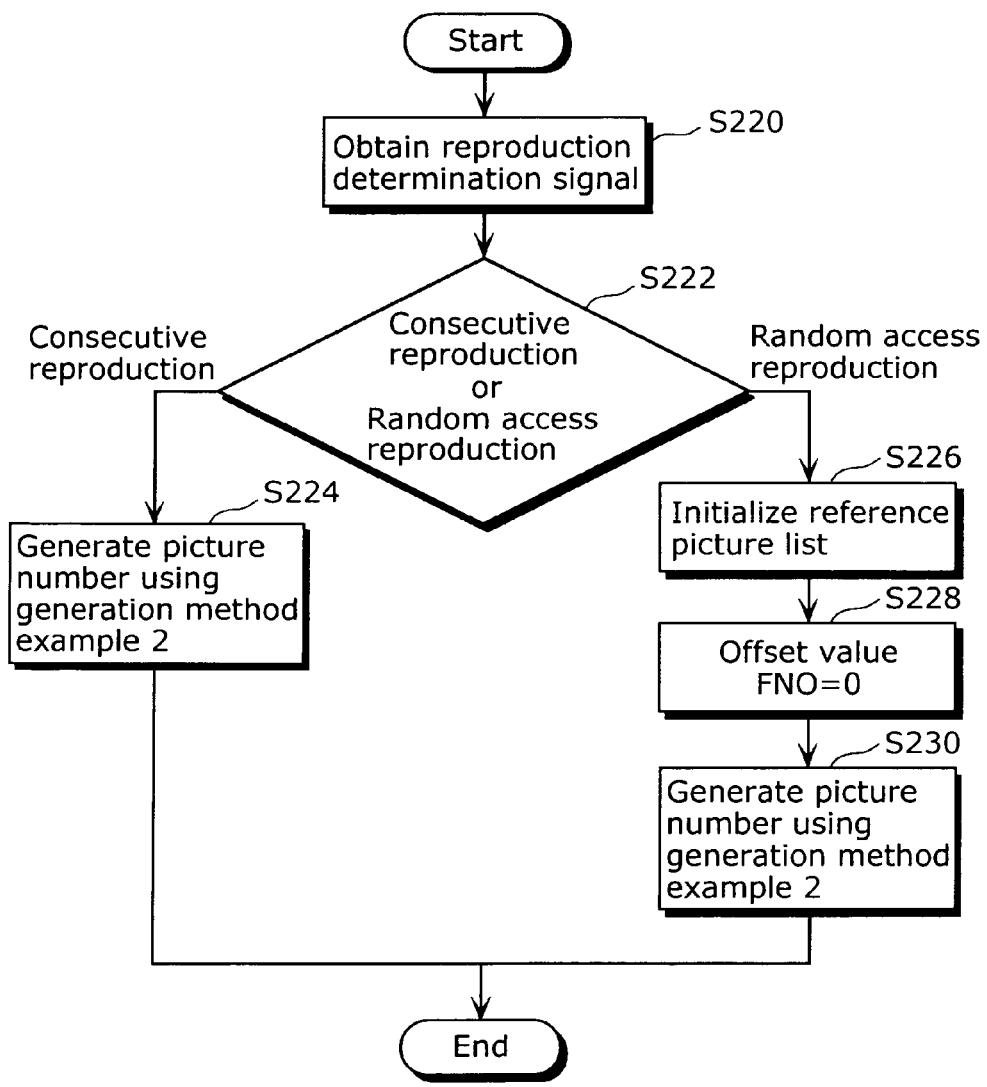
FIG. 18 is a flowchart showing operations of a picture number generation unit according to the second embodiment of the present invention.

FIG. 18 is a flowchart which shows operations by the picture number generation unit 207.

As shown in FIG. 18, the picture number generation unit 207 firstly obtains a reproduction determination signal from the reproduction determination unit 108 (Step S220), and determines whether or not a reproduction method to be designated is normal consecutive reproduction or random access reproduction from a random access point RAP of an Open GOP structure, based on the reproduction determination signal (Step S222).

Here, when determining that normal consecutive reproduction is designated in Step S222, the picture number generation unit 207 generates a picture number based on the generation method example 2 (Step S224).

On the other hand, when determining that random access reproduction is designated in Step S222, the picture number generation unit 207 initializes an STRL which is the reference picture list (Step S226). Specifically, the picture number generation unit 207 turns all pictures stored in the STRL which is the reference picture list to unreferenced pictures. For example, in the list management under the H.264 standard, the state of "STRL reference (used for short term reference)" is updated to the state of "unreferenced (used for reference)".

Due to the initialization of the STRL as a reference picture list, no reference picture is included in the STRL. Therefore, the picture number PN takes its largest value when trick-play (random access reproduction) of the pictures Pic in the STRL is started. Note that, as described with reference to FIG. 9, when the picture number PN is the value closer to the maximum picture number MPN, there is a possibility of causing malfunction that the picture number PN exceeds the maximum picture number MPN as the sequence reproduction from the random access reproduction position is continued. Specifically, in order to manage each picture so as to prevent malfunction, the picture number PN may be set to a positive value closer to 0. In other words, the picture number PN is generated based on the offset value FNO and the frame number fn so that the offset value FNO may be reset to a small natural number.

Accordingly, the picture number generation unit 207 forcibly sets the offset value FNO to 0 (Step S228). Note that, the offset value FNO may be set to a value closer to the state taken when reproduction is started from the Closed GOP, or a small value which is equal to or larger than 0.

The picture management state is changed by such initialization of the reference picture list and setting of the offset value FNO=0.

The picture number generation unit 207 generates, for each picture from the random access point RAP, a picture number PN by adding and doubling the offset value FNO and the frame number (a count value) fn of a current picture, based on the generation method example 2, with the changed picture management state as an initial state (Step S230).

Note that, a stored value of the frame number fn immediately before when random access reproduction is started may be changed to a value such as 0. This aims to prevent that an addition between the offset value FNO and the maximum frame number MFN is caused and the both values of the offset value FNO and the picture number PN are increased.

Figure 9:
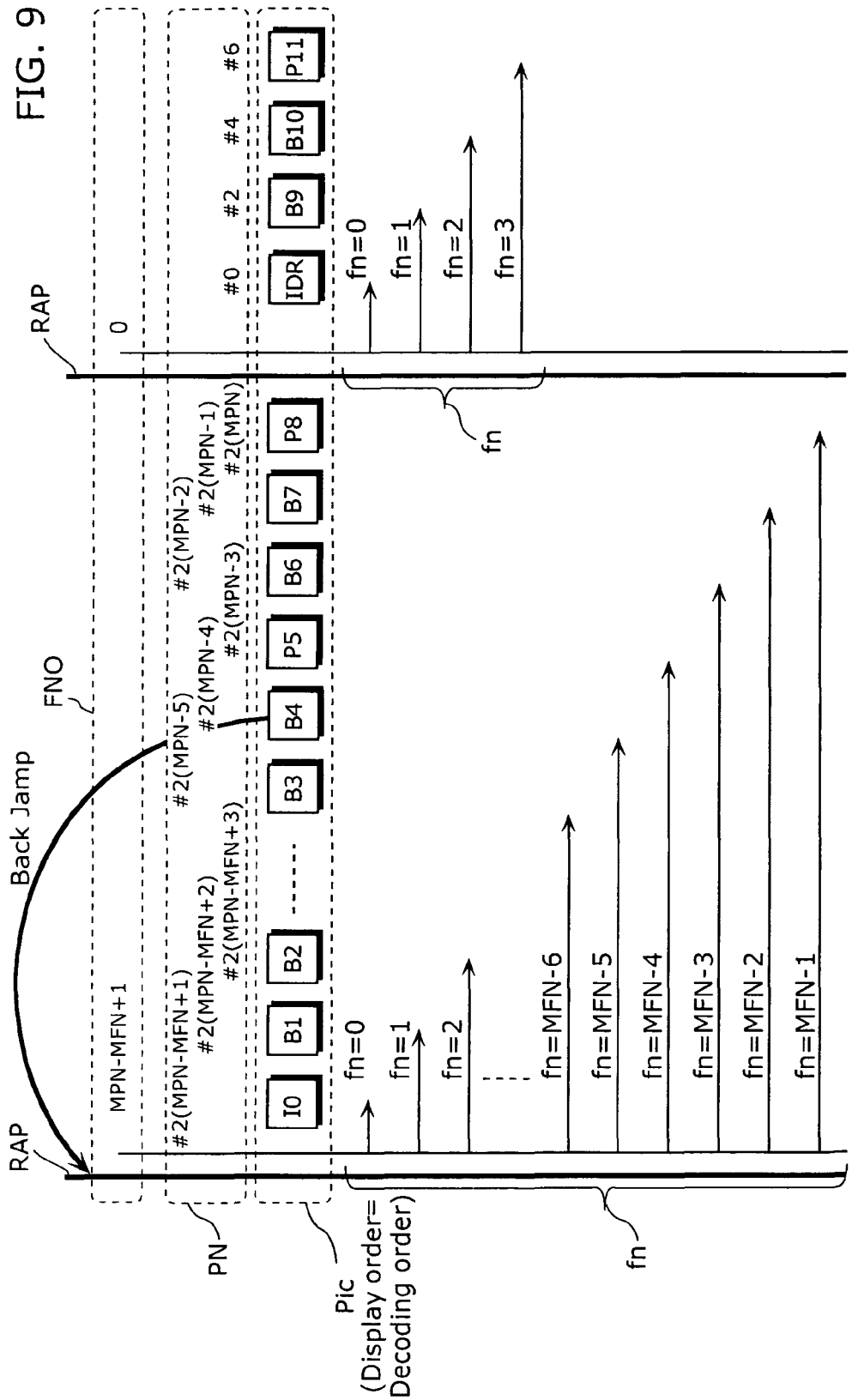
FIG. 9 is a diagram for explaining an STRL management method using the image number generation method example 2.

Accordingly, in the present embodiment, when random access reproduction is performed, the picture management state is changed by initializing the reference picture list and setting the offset value so as to obtain FNO=0. Therefore, it can be prevented that the picture number PN as shown in FIG. 9 exceeds the maximum picture number. Consequently, occurrence of management instability based on the picture numbers PN of pictures on the reference picture list is prevented, and as similar to the case of normal consecutive reproduction, a picture to be decoded can be decoded with reference to appropriate pictures using the relative indexes Ind.

Note that, whereas the method of generating a picture number PN at the time of random access reproduction is explained in the first and second embodiments, if information regarding a Presentation Time Stamp (PTS) indicating a screen display time is included in a stream, it is possible to generate an L0 list and an L1 list by diverting a PTS without switching a method of generating a picture number PN between normal consecutive reproduction and random access reproduction.

(First Variation)

Here, it shall be explained about variation of the reference picture list management method according to the present embodiment.

FIG. 19 is a diagram for explaining a method of managing a reference picture list (STRL) according to the present variation.

For example, it is assumed the case where stream reproduction as shown in FIG. 19(*a*) is performed. Respective pictures included in the stream are processed from the left to right direction in the diagram. In other words, time on the stream goes toward a direction from the left to right. Furthermore, head pictures of respective random access points RAP are pictures I0, I1, I2 and I3.

Here, after continuously reproducing pictures P4, P5, P6 and I7, rearward skipping operation (random access reproduction) which sequentially reproduces a picture I3, a picture I2, a picture I1, and a picture I0 is performed.

In the present embodiment, when such random access reproduction is performed, the previous reference picture lists are initialized. In other words, all pictures listed in the reference picture list are turned into unreferenced pictures. The reference picture list is then managed based on PTS so that the oldest PTS picture from among the unreferenced pictures is deleted from the reference picture list, and a new picture is inserted into the region from which said picture is deleted.

Specifically, as shown in FIG. 19(*b*), the state of the reference picture list becomes: a state a00 when pictures from the picture P4 to the picture I7 are sequentially decoded; a state a01 when the picture I3 is decoded; a state a02 when the picture I2 is decoded; a state a03 when the picture I1 is decoded; and a state a04 when the picture I0 is decoded. It should be noted that the diagonally-shaded pictures in FIG. 19 are unreferenced pictures that are retained as pictures only for display.

In the reference picture list in the state a00, relative indexes Ind are assigned sequentially to the pictures I7, P6, P5 and P4. They are displayed on a screen in reverse order of the pictures P4, P5, P6 and P7. Each picture is a state of either "waiting to be displayed" or "displayed".

In the reference picture list in the state a01, pictures I7, P6, P5 and P4 are determined as "unreferenced", and a picture I3 is newly written over the picture P4 as a reference picture. Furthermore, respective pictures are arranged sequentially in order of the pictures I3, P5, P6 and I7, and displayed on the screen.

In the reference picture list in the state a02, the picture I3 is changed to "unreferenced" picture, and a picture I2 is newly written over the picture I3 as a reference picture. Furthermore, respective pictures are arranged sequentially in order of the pictures I2, P5, P6 and I7, and displayed on the screen.

In the reference picture list in the state a03, the picture I2 is changed to "unreferenced" picture, and a picture I1 is newly written over the picture I2 as a reference picture. Furthermore, respective pictures are arranged sequentially in order of the pictures I1, P5, P6 and I7, and displayed on the screen.

In the reference picture list in the state a04, the picture I0 is changed to "unreferenced" picture, and a picture I0 is newly written over the picture I1 as a reference picture. Furthermore, respective pictures are arranged sequentially in order of the pictures I0, P5, P6 and I7, and displayed on the screen.

Accordingly, depending on a timing of displaying a picture on the screen, the pictures P5, P6 and I7 are displayed, after the picture I0 is reproduced through inverse reproduction.

Furthermore, in the case where decoding processing is performed earlier than screen-displaying processing, there is a possibility that the pictures I3, I2, I1 and I0 stored in the reference picture list cannot be displayed on the screen because they may be overwritten by subsequent decoded pictures before the screen-displaying.

Accordingly, in the present variation, when random access reproduction along with an access to a random access point RAP of an Open GOP is performed, occurrence of the aforementioned malfunction regarding screen-displaying can be prevented by managing the reference picture list without partially using the RTS information.

Specifically, in the present variation, a RAID number is updated every time when random access reproduction is started, and the updated RAID number is assigned to the picture to be stored into the reference picture list. The reference picture list is then managed based on the PTS and the RAID number. Accordingly, as shown in FIG. 19(c), the picture stored in the reference picture list is retained for a long term and occurrence of the aforementioned malfunction can be prevented.

FIG. 20A is a flowchart showing an operation of the memory management unit 206 to assign a RAID number to an assign-target picture to which the RAID number is to be assigned.

First, the memory management unit 206 determines whether or not a current picture, which is a picture to be stored into the reference picture list and to which a RAID number is to be assigned, is a first picture to be reproduced in reproduction processing (Step S300). For example, it determines whether or not all pictures on the reference picture list are "unreferenced" pictures and only the displayed pictures are retained.

Here, when determining that the current picture is the first picture to be reproduced in reproduction processing (Y in Step S300), the memory management unit 206 determines the RAID number for the assign-target picture as 0 (Step S302). On the other hand, when determining that the current picture is not the first picture to be reproduced in the reproduction processing (N in Step S300), the memory management unit 206 further determines whether or not the assign-target picture is a first picture to be reproduced in random access reproduction (Step S304).

Here, when determining that the assign-target picture is a first picture to be reproduced in the random access reproduction (Y in Step S304), the memory management unit 206 determines a value obtained by adding 1 to the RAID number assigned previously to another picture as a RAID number for the assign-target picture (Step S306). On the other hand, when determining that the assign-target picture is not the first picture to be reproduced in the random access reproduction (N in Step S304), the memory management unit 206 determines the RAID number assigned previously to another picture as a RAID number for the assign-target picture (Step S308).

As described in the above, the memory management unit 206 then assigns the determined RAID number to the assign-target picture, and stores the picture into the reference picture list (step S310).

FIG. 20B is a flowchart showing an operation of the memory management unit 206 to select a picture to be deleted from the pictures stored in the reference picture list.

First, the memory management unit 206 selects a picture group having the smallest RAID number from among the pictures stored in the reference picture list (Step S320).

Next, the memory management unit 206 selects a picture having the oldest PTS within the selected picture group as a picture to be deleted (Step S322).

It should be noted that actual process requires determination processes such as whether or not each picture is a "reference" state or "unreferenced" state, and "waiting to be displayed" state or "displayed" state.

FIG. 19(c) is a diagram showing a state of reference picture list realized through management by the memory management unit 206 using the RAID numbers as described in the above.

As shown in FIG. 19(c), the state of the reference picture list becomes: a state a10 when pictures from the picture P4 to the picture I7 are sequentially decoded; a state a11 when the picture I3 is decoded; a state a12 when the picture I2 is decoded; a state a13 when the picture I1 is decoded; and a state a14 when the picture I0 is decoded. It should be noted that diagonally-shaded pictures in FIG. 19 are unreferenced pictures.

In the reference picture list in the state a10, as similar to the case of the reference picture list in the state a00, relative indexes Ind are assigned sequentially to the pictures I7, P6, P5 and P4. They are displayed on a screen in reverse order of the pictures P4, P5, P6 and P7. Each picture is in a state of "waiting to be displayed" or "displayed". Furthermore, the RAID numbers assigned to these all pictures are 0.

In the reference picture list in the state a11, pictures I7, P6, P5 and P4 are turned into "unreferenced" pictures and a picture P4 is deleted, and a new picture I3 is added as a reference picture. Here, the RAID numbers of respective pictures I7, P6 and P5 are 0, and the RAID number of the picture I3 is 1. Therefore, management based on the PTS is not carried out among the pictures I7, P6 and P5 and the picture I3, but is carried out only among the pictures I7, P6 and P5. Accordingly, respective pictures are arranged sequentially in order of the pictures P5, P6, I7 and I3, and displayed on the screen.

In the reference picture list in the state a12, the picture I3 is turned into an "unreferenced" picture and the picture P5 is deleted, and a new picture I2 is added as a reference picture. Furthermore, respective pictures are arranged sequentially in order of the pictures P6, I7, I3 and I2, and displayed on the screen.

In the reference picture list in the state a13, the picture I2 is turned into an "unreferenced" picture, the picture P6 is deleted, and a new picture I1 is added as a reference picture. Furthermore, respective pictures are arranged sequentially in order of the pictures I7, I3, I2 and I1, and displayed on the screen.

In the reference picture list in the state a14, the picture I1 is turned into an "unreferenced" picture and the picture I7 is deleted, and a new picture I0 is added as a reference picture. Furthermore, respective pictures are arranged sequentially in order of the pictures I3, I2, I1 and I0, and displayed on the screen.

Accordingly, in the present variation, the reference picture list is managed based on the PTS and the RAID numbers. Therefore, pictures can be retained in a necessary order for screen display.

It should be noted that, in the present variation, the offset value FNO does not need to be updated when random access reproduction is designated. Specifically, in the present variation, the reference picture list may be initialized without updating the offset value FNO, and the reference picture list may be managed based on the PTS and the RAID numbers as described in the above.

(Second Variation)

Here, it shall be explained about another variation of the reference picture list management method according to the present embodiment. The feature of the present variation is to complementarily change the number of pictures managed by respective STRL and LTRL of the reference picture lists in accordance with a random access reproduction destination.

From FIG. 21A to FIG. 21F are diagrams, each showing a state of reference picture list according to the present variation.

The reference picture list RPL includes an STRL which performs FIFO-type management as described in the above, and an LTRL which carries out deletion of a picture which is explicitly specified from the storage.

For example, as shown in FIG. 21A, the memory management unit 206 configures the reference picture list RPL so that the total of 6 pictures can be managed, stores four pictures of P4, P5, P6 and I7 into the STRL, and stores two pictures of P0 and P1 into the LTRL.

Here, when random access reproduction is performed, the memory management unit 206 firstly turns all pictures to be managed on the reference picture list RPL into unreferenced pictures. Specifically, pictures stored respectively in the LTRL and the STRL are set to unreferenced pictures.

Next, the memory management unit 206 tries to specify the number of pictures to be managed in the STRL and the LTRL from the random access reproduction destination. As a result, if knowing that the number of pictures to be managed in the STRL is 4 pictures and the number of pictures to be managed in the LTRL is 2 pictures from the random reproduction destination, the memory management unit 206 retains the number of pictures managed respectively in the current STRL and LTRL. The memory management unit 206 then sequentially deletes unreferenced pictures stored in the STRL, and stores new four pictures of new0, new1, new 2 and new3 into the STRL as shown in FIG. 21C.

Here, if knowing that the number of pictures to be managed in the STRL is five pictures and the number of pictures to be managed in the LTRL is one picture as the random access reproduction destinations, the memory management unit 206 changes the number of pictures managed respectively in the current STRL and LTRL in accordance with the random access reproduction destination as shown in FIG. 21E. The memory management unit 206 then stores five pictures of new0, new1, new2, new3, and new4 into the STRL.

If the memory management unit 206 does not change the number of pictures managed in the STRL and LTRL in accordance with the random access reproduction destination, the picture new0 is deleted in order to store the picture new4 as shown in FIG. 21D. In such case, the picture new0 cannot be referred to, and a possibility of causing malfunction in the decoding processing is caused. Accordingly, in the present variation, occurrence of malfunction is prevented by changing the number of pictures to be managed in the STRL and LTRL in accordance with the random access reproduction destinations as described in the above.

Furthermore, in the case where knowing the number of pictures to be managed respectively by the STRL and LTRL from the random access reproduction destination is respectively 6 pictures and 0 picture, the memory management unit 206 changes the number of pictures to be managed in the STRL to 6 pictures and the number of pictures to be managed in the LTRL to 0 picture as shown in FIG. 21F. Note that, in the case where it is necessary to store pictures into the LTRL after random access reproduction is started, the pictures are stored after the number of pictures to be managed in the STRL is reduced and the number of pictures to be managed in the LTRL is increased as special processing to be performed when necessary.

Furthermore, in the case where the number of pictures to be managed are not known as a result of trying to specify the number of pictures to be managed in the STRL and LTRL as the random access reproduction destinations, the memory management unit 206 changes the number of pictures to be managed in the STRL to the maximum 6 pictures and the number of pictures to be managed in the LTRL to the minimum 0 picture. It should be noted that, after the above process, the number of pictures to be managed in the STRL and the LTRL are updated every time when it is instructed to store pictures into the LTRL, and the instructed pictures are stored. Such instruction to store pictures into the LTRL is described in a Memory Management Control Operation (MMCO) in a header information region of a picture, for example.

Accordingly, in the present variation, when random access to the Open GOP is occurred, as special processing of managing the reference picture list RPL to be performed when random access reproduction is occurred, the number of pictures to be managed respectively in the STRL and the LTRL are changed in accordance with the random access reproduction destinations after not only setting all pictures in the STRL as "unreferenced" pictures but also setting the all pictures in the LTRL as "unreferenced" pictures.

It should be noted that, in the present variation, the offset value FNO does not need to be updated when random access reproduction is designated. Specifically, in the present variation, the reference picture list may be initialized without updating the offset value FNO, and the number of pictures to be managed in the STRL and LTRL as described in the above may be changed in accordance with the random access reproduction destinations.

Note that, also in the present embodiment and respective variations, as similar to the case of the first variation of the first embodiment, an empty region on the L0 list may be filled with a picture that is stored most recently.

Note that, also in the present embodiment and respective variations, as similar to the case of the second variation of the first embodiment, dummy pictures having picture numbers that are smaller than the picture number of the picture as the random access reproduction destination may be inserted into the STRL and LTRL as many as the number of reference permissible pictures.

Third Embodiment

Furthermore, the processes described in the aforementioned respective embodiments can be easily realized in an independent computer system by recording a program for realizing the image decoding method mentioned in the respective embodiments onto a recording medium such as a flexible disk.

Figure 22A:
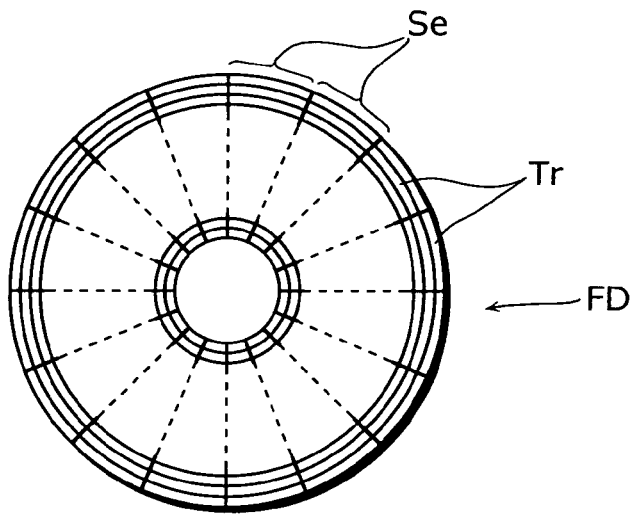
FIG. 22A is a diagram for explaining the case of realizing the image decoding method according to the first and second embodiments in a computer system using a program recorded on a recording medium such as a flexible disc.
Figure 22B:
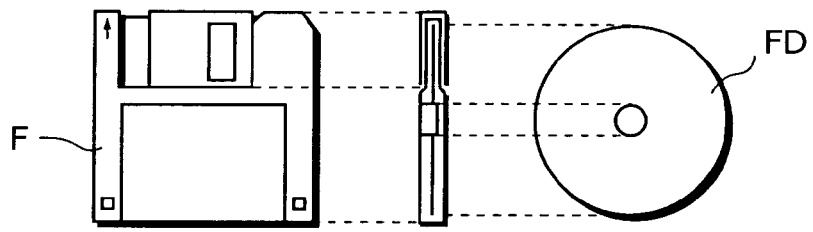
FIG. 22B is other diagram for explaining the case of realizing the image decoding method according to the first and second embodiments in a computer system using a program recorded on a recording medium such as a flexible disc.
Figure 22C:
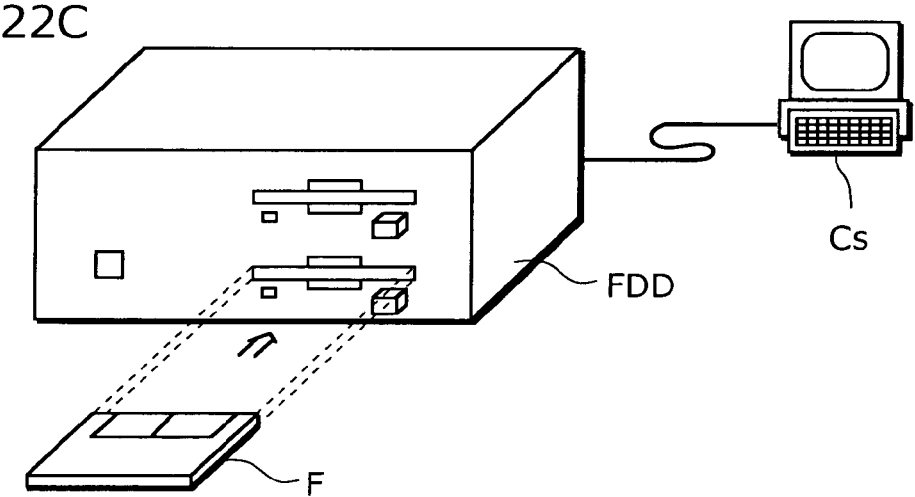
FIG. 22C is other diagram for explaining the case of realizing the image decoding method according to the first and second embodiments in a computer system using a program recorded on a recording medium such as a flexible disc.

FIG. 22A to FIG. 22C are diagrams for explaining the case where image decoding method mentioned in the aforementioned respective embodiments is realized in a computer system using a program recorded on a recording medium such as a flexible disc.

FIG. 22B is a front view and a schematic cross-section of a flexible disk F as well as a front view of a flexible disk itself FD. FIG. 22A shows an example of a physical format of the flexible disc FD as a recording medium body. The flexible disk F is configured by containing the flexible disc FD into a case. A plurality of tracks Tr are formed concentrically on the surface of the flexible disk in the radius direction from the periphery, and each track is divided into 16 sectors Se in the angular direction. Therefore, in the flexible disk F storing the above-mentioned program, the above program is recorded in an area allocated for it on the above flexible disk FD.

In addition, FIG. 22C shows the configuration for recording and reproducing the program on and from the flexible disk F. When the program for realizing the image decoding method is recorded onto the flexible disk F, the computer system Cs writes the program onto the flexible disk FD via a flexible disk drive FDD. Furthermore, when the above image decoding method is constructed in the computer system using the program recorded on the flexible disk F, the program is read out from the flexible disk F via the flexible disk drive FDD and transferred to the computer system.

Note that the above explanation is made on an assumption that a recording medium is a flexible disk, but the same processing can also be performed using an optical disk. In addition, the recording medium is not limited to these, but any other medium such as an IC card, and a ROM cassette can be used in the same manner if a program can be recorded onto them.

Fourth Embodiment

An AV processing apparatus according to the present embodiment performs applied operations using the image decoding method described in the first or second embodiment.

Figure 23:
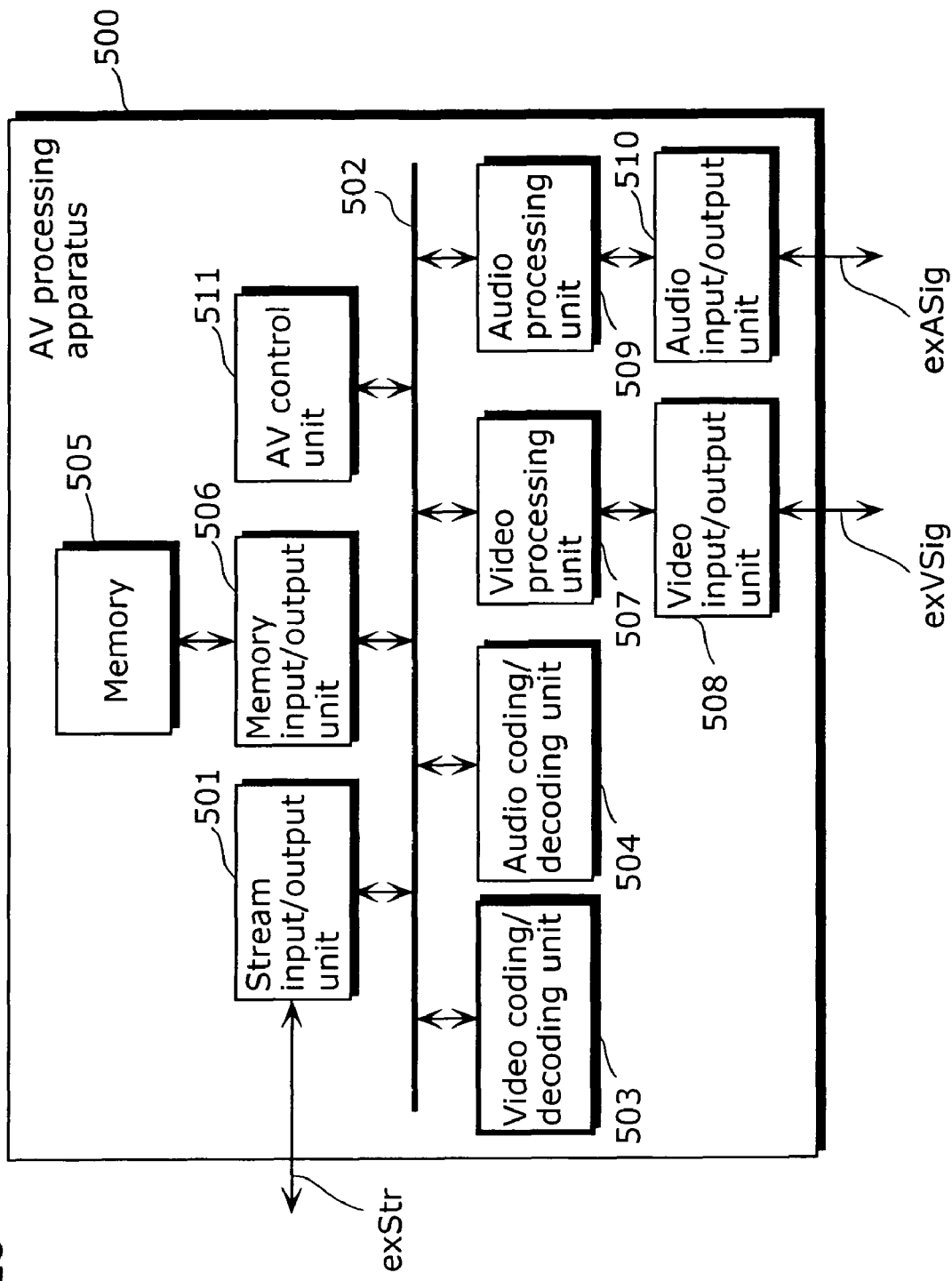
FIG. 23 is a diagram showing a structure of an AV processing apparatus according to a fourth embodiment.

FIG. 23 is a diagram showing a structure of an AV processing apparatus according to the present embodiment.

This AV processing apparatus 500 is configured as a DVD player, a BD-ROM player or the like which reproduces digital compressed audio and video.

A stream input/output unit 501 obtains a stream exStr from the outside of the AV processing apparatus 500. A video coding/decoding unit 503 performs coding and decoding on video. An audio coding/decoding unit 504 performs coding and decoding on audio. A memory 505 holds data such as the stream exStr, coded data, and decoded data. A memory input/output unit 506 performs storage and extraction of data into and from the memory 505. A video processing unit 507 performs pre-processing and post-processing on a video signal. A video input/output unit 508 outputs, to the outside, a video signal as a video signal exVsig which has been processed by the video processing unit 507 or has passed without being processed by the video processing unit 507. Furthermore, the video input/output unit 508 captures the video signal exVSig from the outside.

The audio processing unit 509 also performs pre-processing and post-processing on an audio signal. The audio input/output unit 510 outputs, to the outside, an audio signal as an audio signal exASig which has processed by the audio processing unit 509 or has passed without being processed by the audio processing unit 509. The audio input/output unit 510 also captures the audio signal exASig from the outside. The AV control unit 511 controls the entire AV processing apparatus 500.

The stream input/output unit 501, the picture coding/decoding unit 503, the audio coding/decoding unit 504, a memory input/output unit 506, a video processing unit 507, an audio processing unit 509, and an AV control unit 511 are connected to the bus 502 which transfers the stream exStr and data such as decoded audio/video data.

Here, it shall be described about the decoding operations performed by such AV processing apparatus 500. First, a stream input/output unit exStrIF obtains an audio/video stream exStr through reading out of data from a storage medium such as an optical disk, and data reception from satellite broadcast and the like. The video coding/decoding unit 503 extracts a video stream from the stream exStr, and the audio coding/decoding unit 504 extracts an audio stream from the stream exStr.

The memory input/output unit 506 stores, into the memory 505, video data decoded by the video coding/decoding unit 503. The video processing unit 507 extracts data stored in the memory 505, and performs processing such as noise removal and the like. Furthermore, the video coding/decoding unit 503 extracts the video data stored in the memory 505 again, and uses as a reference picture for inter-picture motion compensation prediction.

Here, the video coding/decoding unit 503 includes the image decoding apparatus 100 or 200 of the first embodiment or the second embodiment. It should be noted that the video coding/decoding unit 503 does not need to include the picture memory 103 of the image decoding apparatuses 100 and 200. In this case, the video coding/decoding unit 503 uses a memory 505 in place of the picture memory 103. Furthermore, the above video stream corresponds to the stream Str of the first embodiment or the second embodiment.

On the other hand, the memory input/output unit 506 stores, into the memory 505, audio data decoded by the audio coding/decoding unit 504. The audio processing unit 509 obtains data stored in the memory 505, and performs processing relating to sound and the like on the obtained data.

Lastly, in temporal synchronization between audio and video, the data processed by the video processing unit 507 is outputted as a video signal exVSig via the video input/output unit 508 and displayed on a television screen and the like. Furthermore, the data processed by the audio processing unit 509 is outputted as an audio signal exASig via the audio input/output unit 510, and outputted from a speaker and the like.

It should be noted that respective functional blocks included in the image decoding apparatus 100 or 200 of the first embodiment or the second embodiment is basically realized as a Large Scale Integration (LSI) that is an integrated circuit. These elements may be separately integrated into one chip, or may be integrated so that only a portion of these elements or all of these elements are included. (For example, functional blocks other than memory such as the picture memory 103 may be integrated into one chip.)

Furthermore, whereas an LSI is used as the integrated circuit, it may be realized as an Integrated Circuit (IC), a system LSI, a super LSI, and an ultra LSI. In addition, a method of constructing an integrated circuit is not limited to the LSI and may be realized as a private circuit or as a general processor. After the LSI is manufactured, a Field Programmable Gate Array (FPGA) capable of programming, and a reconfigurable processor which can reconfigure connection and setting of circuit cells in the LSI may be used. Furthermore, there is no doubt that, if technology of constructing an integrated circuit is introduced as a replace of the LSI by a development of semiconductor technology or derived another technology, the functional blocks may be integrated using such technology. There is a possibility to apply biotechnology and the like.

Furthermore, only a memory (a picture memory 103 and a memory 505) which holds data to be decoded, from among the functional blocks, may be separately constructed without being integrated into one chip.

INDUSTRIAL APPLICABILITY

The image decoding method of the present invention has an effect of capable of decoding a picture to be decoded with reference to appropriate pictures even when random access reproduction is performed, and is applicable to, for example, a DVD player, a BD-ROM player and the like which reproduce video and audio using H.264 standard.

The invention claimed is:

1. An image decoding method for decoding each of a plurality of coded pictures in a stream with reference to a previously decoded picture that is stored in a memory, said image decoding method comprising:
   a first storage step of:
      sequentially decoding at least a portion of the plurality of coded pictures in the stream, so as to obtain a plurality of decoded pictures;
      storing, into the memory, a reference picture to be used as a reference for decoding from among the plurality of decoded pictures; and
      managing the reference picture stored in the memory;
   a determination step of determining whether or not random access reproduction has been designated;
   a state change step of, when said determination step determines that the random access reproduction has been designated, changing a management state for managing the reference picture stored in the memory; and
   a second storage step of, when said determination step determines that the random access reproduction has been designated:
      sequentially decoding at least a portion of the plurality of coded pictures from a random access reproduction destination with the changed management state for managing the reference picture stored in the memory as an initial management state, so as to obtain a plurality of decoded pictures;
      storing, into the memory, the reference picture to be used as the reference from among the plurality of decoded pictures decoded by said second storage step; and
      managing the reference picture stored in the memory by said second storage step based on the changed management state for managing the reference picture stored in the memory.

2. The image decoding method according to claim 1, wherein the plurality of coded pictures in the stream are divided into groups on an access unit basis, and
   wherein said determination step determines whether or not random access reproduction starting from an access unit, which is allowed to refer to a picture of another access unit, has been designated.

3. The image decoding method according to claim 2, wherein in respective said first storage step and said second storage step, the reference picture is managed by generating picture numbers for identifying each of the plurality of decoded pictures and by assigning a generated picture number to each of the plurality of decoded pictures, and
   wherein in said state change step, an offset value for generating a picture number is updated as the management state.

4. The image decoding method according to claim 3, wherein in said first storage step, the offset value is updated so that the offset value is increased every time when all pictures included in a current access unit to be decoded are decoded, and a picture number for each of the plurality of decoded pictures is generated using the offset value and a count value assigned to each of the plurality of decoded pictures in the stream on an access unit basis, wherein in said state change step, the offset value is updated so that the offset value is increased, and
   wherein in said second storage step, with the offset value updated in said state change step as an initial state, the offset value is updated so that the offset value is increased every time when all pictures in a current access unit to be decoded are decoded, and a picture number for each of the plurality of decoded pictures from the random access reproduction destination is generated using the count value and the offset value.

5. The image decoding method according to claim 4, wherein in respective said first storage step and said second storage step and in said state change step, the offset value is updated so that the offset value is increased at least by a maximum value of the count value assigned on the access unit basis.

6. The image decoding method according to claim 2,
   wherein in respective said first storage step and said second storage step, the reference picture is managed by generating picture numbers for identifying each of the plurality of decoded pictures and by assigning a generated picture number to each of the plurality of decoded pictures, and
   wherein in said state change step, the management state is updated by changing all pictures stored in the memory to unreferenced pictures.

7. The image decoding method according to claim 6, wherein in said state change step, all pictures stored in the memory are changed to unreferenced pictures while all of the pictures stored in the memory remain displayable.

8. The image decoding method according to claim 7,
   wherein in said first storage step, an offset value for generating a picture number is updated so that the offset value is increased every time when a count value of a current picture to be decoded is smaller than a count value of a picture decoded immediately before the current picture, and a picture number for each of the plurality of decoded pictures is generated using the offset value and the count value assigned to each of the plurality of decoded pictures in the stream on an access unit basis,
   wherein in said state change step, the offset value existing as the management state is updated so that the offset value is decreased, and
   wherein in said second storage step, with the offset value updated in said state change step as an initial state, the offset value is updated so that the offset value is increased, every time when a count value of a current picture to be decoded is smaller than a count value of a picture decoded immediately before the current picture, and a picture number for each of the plurality of decoded pictures from the random access reproduction destination is generated using the count value and the offset value.

9. The image decoding method according to claim 8, wherein in said state change step, the offset value is updated to 0.

10. The image decoding method according to claim 7, wherein further in said second storage step, a picture to be stored into the memory is managed using start information based on a start of the random access reproduction.

11. The image decoding method according to claim 10, wherein in said second storage step, a random access number, which is to be updated every time when the random access reproduction is started, is used as the start information.

12. The image decoding method according to claim 7,
wherein the memory includes a first storage region and a second storage region, each of the first and second storage regions having a different picture management mode, and
wherein further in said state change step, a size of the first storage region and a size of the second storage region are changed complementarily according to the random access reproduction destination.

13. The image decoding method according to claim 12,
wherein, in the first storage region, an oldest picture, which has been stored for a longest time, is deleted when a new picture is stored, and
wherein, in the second storage region, a designated picture is deleted when a new picture is stored.

14. The image decoding method according to claim 13,
wherein said state change step determines whether or not the size of the first storage region and the size of the second storage region to be set according to the random access reproduction destination can be specified, and
wherein, when said state change step determines that the size of the first storage section and the size of the second storage section cannot be specified, all regions in the memory are allocated to the first storage region.

15. The image decoding method according to claim 6, wherein further in said second storage step, when an unreferenced picture is in the memory, the unreferenced picture is replaced with a reference permissible picture which is stored most recently.

16. The image decoding method according to claim 2,
wherein in respective said first storage step and said second storage step, the reference picture is managed by generating picture numbers for identifying each of the plurality of decoded pictures and by assigning a generated picture number to each of the plurality of decoded pictures, and
wherein in said state change step, a picture number of a picture stored in the memory is changed to a picture number which is smaller than a picture number of a picture from the random access reproduction destination.

17. The image decoding method according to claim 16, wherein in said state change step, the reference picture stored in the memory is replaced with a dummy picture having a picture number which is smaller than the picture number of the reference picture from the random access reproduction destination.

18. The image decoding method according to claim 17, wherein the dummy picture is a picture which is not included in the stream.

19. The image decoding method according to claim 17, wherein the dummy picture is a picture decoded in said first storage step.

20. An image decoding apparatus which decodes each of a plurality of coded pictures in a stream with reference to a previously decoded picture that is stored in a memory, said image decoding apparatus comprising:
a first storage unit operable to:
sequentially decode at least a portion of the plurality of coded pictures in the stream, so as to obtain a plurality of decoded pictures;
store, into the memory, a reference picture to be used as a reference for decoding from among the plurality of decoded pictures; and
manage the reference picture stored in the memory;
a determination unit operable to determine whether or not random access reproduction has been designated;
a state change unit operable to, when said determination unit determines that the random access reproduction has been designated, change a management state for managing the reference picture stored in the memory; and
a second storage unit operable to, when said determination unit determines that the random access reproduction has been designated:
sequentially decode at least a portion of the plurality of coded pictures from a random access reproduction destination with the changed management state for managing the reference picture stored in the memory as an initial management state, so as to obtain a plurality of decoded pictures;
store, into the memory, the reference picture to be used as the reference from among the plurality of decoded pictures decoded by said second storage unit; and
manage the reference picture stored in the memory by said second storage unit based on the changed management state for managing the reference picture stored in the memory.

21. An integration circuit which decodes each of a plurality of coded pictures in a stream with reference to a previously decoded picture that is stored in a memory, said integration circuit comprising:
a first storage unit operable to:
sequentially decode at least a portion of the plurality of coded pictures in the stream, so as to obtain a plurality of decoded pictures;
store, into the memory, a reference picture to be used as a reference for decoding from among the plurality of decoded pictures; and
manage the reference picture stored in the memory;
a determination unit operable to determine whether or not random access reproduction has been designated;
a state change unit operable to, when said determination unit determines that the random access reproduction has been designated, change a management state for managing the reference picture stored in the memory; and
a second storage unit operable to, when said determination unit determines that the random access reproduction has been designated:
sequentially decode at least a portion of the plurality of coded pictures from a random access reproduction destination with the changed management state for managing the reference picture stored in the memory as an initial management state, so as to obtain a plurality of decoded pictures;
store, into the memory, the reference picture to be used as the reference from among the plurality of decoded pictures decoded by said second storage unit; and
manage the reference picture stored in the memory by said second storage unit based on the changed management state for managing the reference picture stored in the memory.

22. A non-transitory computer-readable recording medium having a program recorded thereon, the program for decoding each of a plurality of coded pictures in a stream with reference to a previously decoded picture that is stored in a memory, and the program causing a computer to execute a method comprising:
a first storage step of:
sequentially decoding at least a portion of the plurality of coded pictures in the stream, so as to obtain a plurality of decoded pictures;
storing, into the memory, a reference picture to be used as a reference for decoding from among the plurality of decoded pictures; and managing the reference picture stored in the memory;

a determination step of determining whether or not random access reproduction has been designated;

a state change step of, when said determination step determines that the random access reproduction has been designated, changing a management state for managing the reference picture stored in the memory; and a second storage step of, when said determination step determines that the random access reproduction has been designated:

sequentially decoding at least a portion of the plurality of coded pictures from a random access reproduction destination with the changed management state for managing the reference picture stored in the memory as an initial management state, so as to obtain a plurality of decoded pictures;

storing, into the memory, the reference picture to be used as the reference from among the plurality of decoded pictures decoded by said second storage step; and managing the reference picture stored in the memory by said second storage step based on the changed management state for managing the reference picture stored in the memory.

* * * * *